US010994480B2

(12) United States Patent
Wolf et al.

(10) Patent No.: US 10,994,480 B2
(45) Date of Patent: May 4, 2021

(54) THREE-DIMENSIONAL PRINTER SYSTEMS AND METHODS

(71) Applicant: WOLF & ASSOCIATES, INC., Costa Mesa, CA (US)

(72) Inventors: Erick Packard Wolf, Corona del Mar, CA (US); Jowell Randall, Huntington Beach, CA (US)

(73) Assignee: WOLF & ASSOCIATES, INC., Costa Mesa, CA (US)

( * ) Notice: Subject to any disclaimer, the term of this patent is extended or adjusted under 35 U.S.C. 154(b) by 256 days.

(21) Appl. No.: 15/616,798

(22) Filed: Jun. 7, 2017

(65) Prior Publication Data

US 2017/0355139 A1     Dec. 14, 2017

Related U.S. Application Data

(60) Provisional application No. 62/347,402, filed on Jun. 8, 2016.

(51) Int. Cl.
| | |
|---|---|
| *B29C 64/20* | (2017.01) |
| *B29C 48/025* | (2019.01) |
| *B29C 48/80* | (2019.01) |
| *B29C 64/209* | (2017.01) |
| *B29C 48/92* | (2019.01) |

(Continued)

(52) U.S. Cl.
CPC .......... *B29C 64/20* (2017.08); *B29C 48/0255* (2019.02); *B29C 48/802* (2019.02); *B29C 48/92* (2019.02); *B29C 64/209* (2017.08); *B29C 64/386* (2017.08); *B29C 64/393* (2017.08); *B29K 2105/108* (2013.01); *B29K 2855/02* (2013.01); *B29K 2877/00* (2013.01); *B29K 2995/0017* (2013.01); *B33Y 30/00* (2014.12)

(58) Field of Classification Search
CPC ..... B29C 64/386; B29C 64/393; B29C 64/20; B29C 64/209; B29C 48/92; B29C 48/0255; B29C 48/802; B33Y 30/00; B29K 2105/108; B29K 2995/0017; B29K 2877/00; B29K 2855/02
See application file for complete search history.

(56) References Cited

U.S. PATENT DOCUMENTS

| | | |
|---|---|---|
| 5,340,433 A | 8/1994 | Crump |
| 5,503,785 A | 4/1996 | Crump et al. |

(Continued)

FOREIGN PATENT DOCUMENTS

| | | |
|---|---|---|
| KR | 10-2010-0004475 | 1/2010 |
| WO | WO 2015/057886 | 4/2015 |

OTHER PUBLICATIONS

International Search Report and Written Opinion dated Jan. 14, 2015 issued in PCT/US2014/060762, filed Oct. 15, 2014, 9 pages.

*Primary Examiner* — Jeffrey M Wollschlager
(74) *Attorney, Agent, or Firm* — Knobbe Martens Olson & Bear LLP

(57) ABSTRACT

Disclosed are embodiments of a three-dimensional (3D) printer for building 3D objects with layer based, additive manufacturing techniques. The hot end can be moved in a horizontal plane parallel a planar printing surface of the printing bed while the printing bed can be moved perpendicular to the planar printing surface to print a 3D object. The hot end can be part of an extrusion guide assembly. The 3D printer can auto-level the printing bed.

7 Claims, 12 Drawing Sheets

(51) Int. Cl.
  *B29C 64/393* (2017.01)
  *B29C 64/386* (2017.01)
  *B33Y 30/00* (2015.01)
  *B29K 105/10* (2006.01)

(56) References Cited

U.S. PATENT DOCUMENTS

| | | | |
|---|---|---|---|
| 6,004,124 A | 12/1999 | Swanson et al. | |
| D446,826 S | 8/2001 | Dunn et al. | |
| 6,629,011 B1 * | 9/2003 | Calderon | B29C 64/106 |
| | | | 264/401 |
| D514,556 S | 2/2006 | Rising | |
| 7,168,935 B1 | 1/2007 | Taminger et al. | |
| 7,297,304 B2 | 11/2007 | Swanson et al. | |
| D565,648 S | 4/2008 | Egami | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,706,910 B2 | 4/2010 | Hull et al. | |
| D616,045 S | 5/2010 | Tervo | |
| 7,731,887 B2 | 6/2010 | Hull et al. | |
| 7,771,183 B2 | 8/2010 | Hull et al. | |
| 7,896,209 B2 | 3/2011 | Batchelder et al. | |
| 7,931,460 B2 | 4/2011 | Scott et al. | |
| 7,938,351 B2 | 5/2011 | Taatjes et al. | |
| 8,105,066 B2 | 1/2012 | Sperry et al. | |
| 8,105,527 B2 | 1/2012 | Wahlstrom | |
| 8,119,053 B1 | 2/2012 | Bedal et al. | |
| 8,153,182 B2 | 4/2012 | Comb et al. | |
| 8,153,183 B2 | 4/2012 | Skubic et al. | |
| 8,185,229 B2 | 5/2012 | Davidson | |
| 8,215,371 B2 | 7/2012 | Batchelder | |
| 8,222,908 B2 | 7/2012 | Paul et al. | |
| 8,226,395 B2 | 7/2012 | Pax et al. | |
| 8,252,223 B2 | 8/2012 | Medina et al. | |
| 8,282,380 B2 | 10/2012 | Pax et al. | |
| 8,285,411 B2 | 10/2012 | Hull et al. | |
| 8,287,794 B2 | 10/2012 | Pax et al. | |
| 8,287,959 B2 | 10/2012 | Batchelder | |
| D677,723 S | 3/2013 | Buel et al. | |
| 8,414,280 B2 | 4/2013 | Pettis | |
| 8,425,218 B2 | 4/2013 | Pettis | |
| D681,548 S | 5/2013 | Zhang et al. | |
| 8,465,689 B2 | 6/2013 | Sperry et al. | |
| 8,469,692 B2 | 6/2013 | Kritchman et al. | |
| D688,741 S | 8/2013 | Joyce | |
| 8,512,024 B2 | 8/2013 | Pax | |
| 8,521,320 B2 | 8/2013 | Silverbrook | |
| 8,529,240 B2 | 9/2013 | Mayer | |
| 8,562,324 B2 | 10/2013 | Pettis | |
| 8,609,204 B2 | 12/2013 | Kritchman | |
| 8,636,494 B2 | 1/2014 | Gothait et al. | |
| D698,869 S | 2/2014 | Strzelewicz et al. | |
| 8,642,692 B1 | 2/2014 | Stockwell et al. | |
| 8,647,098 B2 | 2/2014 | Swanson et al. | |
| 8,647,102 B2 | 2/2014 | Swanson et al. | |
| 8,668,859 B2 | 3/2014 | Pettis | |
| D705,643 S | 5/2014 | Siboni et al. | |
| 8,718,522 B2 | 5/2014 | Chillscyzn et al. | |
| 8,747,097 B2 | 6/2014 | Pettis | |
| D711,463 S | 8/2014 | Costabeber | |
| D722,108 S | 2/2015 | Reches et al. | |
| D729,309 S | 5/2015 | Jun et al. | |
| D730,979 S | 6/2015 | Anantha et al. | |
| D732,587 S | 6/2015 | Hsu et al. | |
| D732,588 S | 6/2015 | Lin et al. | |
| D733,196 S | 6/2015 | Wolf et al. | |
| D734,814 S | 7/2015 | Yeh et al. | |
| D736,838 S | 8/2015 | Costabeber | |
| D737,345 S | 8/2015 | Anantha et al. | |
| D737,346 S | 8/2015 | Anantha et al. | |
| D739,885 S | 9/2015 | Lee et al. | |
| D740,863 S | 10/2015 | Kemperle et al. | |
| D745,069 S | 12/2015 | Kemperle et al. | |
| D745,903 S | 12/2015 | Armani | |
| D760,306 S | 6/2016 | Wolf | |
| 9,481,134 B2 * | 11/2016 | Steiner | F16M 13/022 |
| D776,727 S | 1/2017 | Wolf | |
| 9,731,452 B2 * | 8/2017 | Din | G05B 19/4086 |
| 9,731,493 B2 * | 8/2017 | Chang | B33Y 30/00 |
| 9,764,514 B2 * | 9/2017 | Albert | B29C 67/245 |
| 9,808,290 B2 * | 11/2017 | Landry | A61B 17/56 |
| 10,029,423 B2 * | 7/2018 | Chang | B29C 64/106 |
| 10,406,801 B2 * | 9/2019 | Bell | B29C 64/386 |
| 2012/0018924 A1 | 1/2012 | Swanson et al. | |
| 2012/0121748 A1 * | 5/2012 | Planta Torralba | |
| | | | B05C 17/00546 |
| | | | 425/174.2 |
| 2013/0241102 A1 | 9/2013 | Rodgers et al. | |
| 2013/0242317 A1 * | 9/2013 | Leavitt | B41J 29/393 |
| | | | 358/1.8 |
| 2013/0327917 A1 * | 12/2013 | Steiner | F16M 11/12 |
| | | | 248/649 |
| 2013/0329257 A1 | 12/2013 | Pettis et al. | |
| 2013/0329258 A1 | 12/2013 | Pettis et al. | |
| 2014/0034214 A1 | 2/2014 | Boyer et al. | |
| 2014/0035182 A1 | 2/2014 | Boyer et al. | |
| 2014/0036034 A1 | 2/2014 | Boyer et al. | |
| 2014/0039659 A1 | 2/2014 | Boyer et al. | |
| 2014/0039662 A1 | 2/2014 | Boyer et al. | |
| 2014/0039663 A1 | 2/2014 | Boyer et al. | |
| 2014/0042657 A1 | 2/2014 | Mulliken | |
| 2014/0042670 A1 | 2/2014 | Pettis et al. | |
| 2014/0043630 A1 | 2/2014 | Buser et al. | |
| 2014/0044822 A1 | 2/2014 | Mulliken | |
| 2014/0046473 A1 | 2/2014 | Boynton et al. | |
| 2014/0048970 A1 | 2/2014 | Batchelder et al. | |
| 2014/0070445 A1 | 3/2014 | Mayer | |
| 2014/0070461 A1 | 3/2014 | Pax | |
| 2014/0074274 A1 | 3/2014 | Douglas et al. | |
| 2014/0117575 A1 | 5/2014 | Kemperle et al. | |
| 2014/0117585 A1 | 5/2014 | Douglas et al. | |
| 2014/0120196 A1 | 5/2014 | Schmehl | |
| 2014/0121813 A1 | 5/2014 | Schmehl | |
| 2014/0129020 A1 | 5/2014 | Kroner et al. | |
| 2014/0129021 A1 | 5/2014 | Boynton et al. | |
| 2014/0129022 A1 | 5/2014 | Briscella et al. | |
| 2015/0057781 A1 * | 2/2015 | Din | G05B 19/4086 |
| | | | 700/98 |
| 2015/0165687 A1 * | 6/2015 | Ho | H05B 3/22 |
| | | | 425/144 |
| 2015/0183138 A1 * | 7/2015 | Duty | B29C 64/209 |
| | | | 264/427 |
| 2015/0343688 A1 * | 12/2015 | Goodman | B33Y 10/00 |
| | | | 264/39 |
| 2016/0096329 A1 * | 4/2016 | Ko | B33Y 30/00 |
| | | | 264/129 |
| 2016/0176118 A1 * | 6/2016 | Reese | B29C 64/386 |
| | | | 425/89 |
| 2016/0236408 A1 * | 8/2016 | Wolf | B33Y 30/00 |
| 2016/0257068 A1 * | 9/2016 | Albert | B29C 67/245 |
| 2016/0354980 A1 * | 12/2016 | Ho | G05B 19/4099 |
| 2017/0001381 A1 * | 1/2017 | Suzuki | G03G 15/1625 |
| 2017/0043538 A1 * | 2/2017 | Chang | B33Y 30/00 |
| 2017/0057173 A1 * | 3/2017 | van der Zalm | B33Y 10/00 |
| 2017/0315526 A1 * | 11/2017 | Kim | B29C 64/386 |

* cited by examiner

THREE-DIMENSIONAL PRINTER SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure generally relates to three-dimensional (3D) printers and in particular, to additive manufacturing systems for building 3D objects with layer based, additive manufacturing techniques.

Description of the Related Art

Three-dimensional (3D) printing is a process used for the printing of three-dimensional objects, for example, by printing or building parts of such objects in layers. Such 3D objects may be used, for example, for prototype parts. An additive manufacturing system (e.g., a fused deposition modeling (FDM) or extrusion-based additive manufacturing system) is used to build 3D objects, parts, or models from a digital representation of the 3D object (e.g., STL, OBJ, and AMF format files) using one or more additive manufacturing techniques such as layer-by-layer extrusion of a flowable part material. Movement of the extrusion head with respect to the substrate is performed under computer control, in accordance with build data that represents the 3D object. The build data is obtained by initially slicing the digital representation of the 3D object into multiple horizontally sliced layers. Then, for each sliced layer, the host computer generates a build path for depositing roads of modeling material to form the 3D object.

The part of modeling material is extruded through an extrusion tip carried by an extrusion/print head (e.g., a hot end) and is deposited as a sequence of roads on a substrate in an x-y plane. The extruded part material fuses to previously deposited modeling material, and solidifies upon a drop in temperature. The position of the extrusion head or other components relative to the substrate is then incremented along a z-axis (z direction perpendicular to the x-y plane), and the process is repeated to form a 3D part resembling the digital representation. The extrusion temperature usually ranges from about 170 to 315 degrees Celsius, depending on factors such as material, speed, and nozzle diameter. The materials can include ABS (acrylonitrile butadiene styrene), PLA (polylactic acid), PVA (polyvinyl alcohol), HIPS (high impact polystyrene), Nylon, polycarbonate, and other thermoplastics, polymers, hybrid materials, and in some cases metals. The deposited layers may vary in thickness, but generally range from about 0.1 to 0.4 millimeters for most FDM printing.

Extrusion heads designed for relatively fast extrusion and multiple material compatibility may have a heating component and a cooling component. The heating component is used to soften the material for 3D layering, while the cooling component keeps the material below melting temperature prior to entering the heating component to ensure the material is correctly extruded. Configurations and assemblies of hot ends and numerous accompanying components are usually complicated and do not allow for easy assembly or ease of maintenance and replacement of parts, particularly to customers new to 3D printing.

Relatedly, the extrusion head needs to be supported (e.g., by a carriage, deck, etc.) on the 3D printer away from a bed upon which the object is being printed on. The carriage also needs to provide a mechanism for supplying the modeling material to the extrusion head. A balance between performance, precision, accuracy, and weight for the extrusion head needs to be achieved to reach a desired printed quality of a 3D object.

What is needed is a 3D printer with a hot end deck and a print bed together or separately provide improved accuracy, precision, reliability/longevity, and ease of maintenance and replacement.

SUMMARY

According to this disclosure, an extension assembly movement system for a three-dimensional printer includes one or more of the following: a frame comprising a first side and a second side opposite the first side; a first rod connected to the frame, the first rod extending along an x-axis proximate to the first side of the frame; a second rod connected to the frame, the second rod extending along the x-axis parallel to the first rod and proximate to the second side of the frame; a first brace movably coupled to the first rod, the first brace capable of being translated on the first rod along the x-axis; a second brace movably coupled to the second rod, the second brace capable of being translated on the second rod along the x-axis; a third rod connected to the first and second braces, the third rod extending along a y-axis; a fourth rod connected to the first and second braces, the fourth rod extending along the y-axis parallel to the third rod; an extrusion assembly movably coupled to the third and fourth rods, the extrusion assembly capable of being translated on the third and fourth rods along the y-axis, the extrusion assembly configured to extrude consumable material to build a three-dimensional object; a first plurality of rotating shafts positioned in a first plane along the x-axis and the y-axis, each of the first plurality of rotating shafts configured to rotate about a corresponding central axis; a first belt fixedly coupled to the extrusion assembly, the first belt looped about the first plurality of rotating shafts in the first plane; a first motor connected to the first belt, the first motor configured to move the first belt in the first plane about the first plurality of rotating shafts; a second plurality of rotating shafts positioned in a second plane along the x-axis and the y-axis, each of the second plurality of rotating shafts configured to rotate about a corresponding central axis, the second plane parallel to the first plane; a second belt fixedly coupled to the extrusion assembly, the second belt looped about second plurality of rotating shafts in the second plane; and/or a second motor coupled to the second belt, the first motor configured to move the second belt in the second plane about the second plurality of rotating shafts. The first and second motors spin in a same direction to move the extrusion assembly along the third and fourth rods in the y-axis via moving the first and second belts. The first and second motors spin in opposite directions to move the extrusion assembly in the x-axis via moving the first and second brace along the first and second rods. According to this disclosure, a method of manufacturing the extrusion assembly movement system for a three-dimensional printer is provided.

According to this disclosure, the system further includes one or more of the following: a first corner on the first side; a second corner on the first side, the second corner opposite the first corner along the first side; a third corner on the second side, the third corner opposite the second corner along a third side of the frame extending along the x-axis; and/or a fourth corner on the second side, the fourth corner opposite the third corner along the second side; a first rotating shaft of the first plurality of rotating shafts connected to the first brace in the first plane; a second rotating shaft of the first plurality of rotating shafts connected to the second brace in the first plane; a third rotating shaft of the first plurality of rotating shafts positioned proximate to the third corner in the first plane; and/or a fourth rotating shaft of the first plurality of rotating shafts positioned proximate to the second corner in the first plane; the first motor is positioned proximate to the first corner; the first belt extends from the first motor to the first rotating shaft, from the first rotating shaft to the second rotating shaft, from the second rotating shaft to the third rotating shaft, from the third rotating shaft to the fourth rotating shaft, and from the fourth rotating shaft to the first motor; the third and fourth rotating shafts are connected to the frame; the first motor is connected to the frame; a fifth rotating shaft of the second plurality of rotating shafts connected to the second brace in the second plane; a sixth rotating shaft of the second plurality of rotating shafts connected to the first brace in the second plane; a seventh rotating shaft of the second plurality of rotating shafts positioned proximate to the second corner in the second plane; and/or an eighth rotating shaft of the second plurality of rotating shafts positioned proximate to the third corner in the second plane; the second motor is positioned proximate to the fourth corner; and/or the second belt extends from the second motor to the fifth rotating shaft, from the fifth rotating shaft to the sixth rotating shaft, from the sixth rotating shaft to the seventh rotating shaft, from the seventh rotating shaft to the eighth rotating shaft, and from the eighth rotating shaft to the second motor; the seventh and eights rotating shafts are connected to the frame; the second motor is connected to the frame; the first and second rods are perpendicular to the third and fourth rods; the first, second, third, and fourth rods are round; at least one of the first or second pluralities of rotating shafts comprises a pulley; at least one of the first or second pluralities of rotating shafts comprises a bearing; the first belt comprises teeth configured to mate with teeth of a rotating shaft of the first motor, wherein the first motor is configured to rotate the rotating shaft of the first motor to move the first belt; at least some of the first plurality of rotating shafts comprise teeth configured to mate with the teeth of the first belt; the second belt comprises teeth configured to mate with teeth of a rotating shaft of the second motor, wherein the second motor is configured to rotate the rotating shaft of the second motor to move the second belt; the first and second belts are passed through a body of the extrusion assembly to fixedly couple the first and second belts to the extrusion assembly, and wherein the first and second belts intersect when projected onto the first plane or the second plane; a section of the first belt between the third rotating shaft and the fourth rotating shaft and a section of the second belt between the seventh rotating shaft and the eighth rotating shaft intersect when projected onto the first plane or the second plane; the first belt is continuous; the first belt is manufactured using endless construction; the system is modular and is configured to be installed and removed from a three-dimensional printer as a single unit; the system is configured to be removed from the three-dimensional printer as the single unit by removing and/or the frame. According to this disclosure, a method of manufacturing the extrusion assembly movement system for a three-dimensional printer is provided.

According to this disclosure, a method wing a hot end of a three-dimensional printer, the system includes one or more of the following: moving a first belt positioned in a first plane via a first motor, the first belt looped about a first plurality of rotating shafts positioned in the first plane; moving a second belt positioned in a second plane via a second motor, the second belt looped about a second plurality of rotating shafts positioned in the second plane, the second plane parallel to the first plane; moving a first brace along a first rod extending along an x-axis via movement of at least one of the first belt or the second belt; moving a second brace along a second rod extending along the x-axis via movement of at least one of the first belt or the second belt; and/or moving a hot end of a three-dimensional printer along the x-axis, a y-axis, or both the x-axis and the y-axis via the hot end being movably connected to a third rod that is connected to the first and second braces along the y-axis, the hot end configured to extrude consumable material to build a three-dimensional object. The hot end is moved in the x-axis by the third rod being moved in the x-axis when the first and second braces are moved along the first and second rods via the first and second belts. The hot end is moved in the y-axis by being moved on the third rod with via the first and second belts.

According to this disclosure, the system further includes one or more of the following: the first and second motors spin in a same direction to move the hot end in the y-axis along the third rod via moving the first and second belts, and wherein the first and second motors spin in opposite directions to move the hot end in the x-axis via moving the first and second brace along the first and second rods; comprising moving the hot end along the x-axis, a y-axis, or both the x-axis and the y-axis via the hot end being movably connected to the third rod and a fourth rod parallel to the third rod, the fourth rod connected to the first and second braces along the y-axis; the step of moving the first belt in the first plane about the first plurality of rotating shafts via the first motor includes moving the first belt between the first motor and a first rotating shaft of the first plurality of rotating shafts, the first motor positioned proximate to a first corner of the three-dimensional printer, the first rotating shaft positioned proximate to a second corner of the three-dimensional printer, the second corner opposite the first corner along the x-axis; the step of moving the first belt in the first plane about the first plurality of rotating shafts via the first motor includes moving the first belt between the first rotating shaft and a second rotating shaft of the first plurality of rotating shafts, the second rotating shaft positioned proximate to a third corner of the three-dimensional printer, the third corner opposite the second corner along the y-axis; the step of moving the first belt in the first plane about the first plurality of rotating shafts via the first motor includes moving the first belt between the second rotating shaft and a third rotating shaft of the first plurality of rotating shafts, the third rotating shaft connected to the second brace; the step of moving the first belt in the first plane about the first plurality of rotating shafts via the first motor includes moving the first belt between the third rotating shaft and a fourth rotating shaft of the first plurality of rotating shafts, the fourth rotating shaft connected to the first brace; and/or the step of moving the first belt in the first plane about the first plurality of rotating shafts via the first motor includes moving the first belt between fourth rotating shaft and the first motor; the step of moving the second belt in the second plane about the second plurality of rotating shafts via the second motor includes moving the second belt between the second motor and a fifth rotating shaft of the first plurality of rotating shafts, the second motor positioned proximate to a fourth corner of the three-dimensional printer, the fourth corner opposite the third corner along the x-axis, the fifth rotating shaft positioned proximate to the third corner; the step of moving the second belt in the second plane about the second plurality of rotating shafts via the second motor includes moving the second belt between the fifth rotating shaft and a sixth rotating shaft of the second plurality of rotating shafts, the sixth rotating shaft positioned proximate to the second corner; the step of moving the second belt in the second plane about the second plurality of rotating shafts via the second motor includes moving the second belt between the sixth rotating shaft and a seventh rotating shaft of the second plurality of rotating shafts, the seventh rotating shaft connected to the first brace; the step of moving the second belt in the second plane about the second plurality of rotating shafts via the second motor includes moving the second belt between the seventh rotating shaft and an eighth rotating shaft of the second plurality of rotating shafts, the eighth brace connected to the second brace; and/or the step of moving the second belt in the second plane about the second plurality of rotating shafts via the second motor includes moving the second belt between eighth rotating shaft and the second motor; and/or the second motor is connected to the frame.

According to this disclosure, an extrusion assembly movement system for a three-dimensional printer includes one or more of the following: a first track extending along an x-axis; a second track extending along the x-axis parallel to the first track; a first support movably coupled to the first track, the first support capable of being moved on the first track along the x-axis; a second support movably coupled to the second track, the second support capable of being moved on the second track along the x-axis; a third track connected to the first and second supports, the third track extending along a y-axis; an extrusion assembly movably coupled to the third track, the extrusion assembly capable of being moved on the third track along the y-axis, the extrusion assembly configured to extrude consumable material to build a three-dimensional object; a first plurality of rotating shafts positioned in a first plane along the x-axis and the y-axis; a first belt fixedly coupled to the extrusion assembly, the first belt positioned about the first plurality of rotating shafts in the first plane; a second plurality of rotating shafts positioned in a second plane along the x-axis and the y-axis, the second plane parallel to the first plane; and/or a second belt fixedly coupled to the extrusion assembly, the second belt positioned about the second plurality of rotating shafts in the second plane. The first and second belts move in a same direction, the first and second belts move the extrusion assembly along the third track. The first and second belts move in opposite directions, the first and second belts move the extrusion assembly move the first and second support along the first and second tracks.

According to this disclosure, the system further includes one or more of the following: a fourth track connected to the first and second supports, the fourth track extending along the y-axis parallel to the third track, wherein the extrusion assembly is movably coupled to the fourth track, the extrusion assembly capable of being moved on the fourth track along the y-axis; and/or the system is modular and may be installed and removed from a three-dimensional printer as a single unit.

According to this disclosure, an auto-leveling system for a three-dimensional printer includes one or more of the following: a hot end configured to extrude consumable material to build a three-dimensional object, the hot end comprising an electrically conductive material; a hot end motion control assembly configured to move the hot end in an x-y plane; a print bed configured to support the three-dimensional object; a print bed motion control assembly configured to move the print bed in the z-axis; and a controller configured to send commands to the hot end motion control assembly to move the hot end and send commands to the print bed motion control assembly to move the print bed. The print bed includes one or more of the following: a heat plate configured to support a print glass on which the three-dimensional object is built; and/or a bed plate attached to the heat plate. The bed plate includes one or more of the following: a base; a wall connected to the base, the wall extending along a z-axis at least partially circumscribing the heat plate, wherein the z-axis is perpendicular to the x-y plane; and/or a flange connected to the wall and comprising an electrically conductive material, the flange extending in the x-y plane over the heat plate such that the heat plate is between the base and the flange, wherein when the electrically conduct material of the flange contacts the electrically conductive material of the hot end, an electrical circuit is completed. The controller is configured to automatically determine a level of the print bed relative to the x-y plane by any of the following: sending a first command to the hot end motion control assembly to move the hot end to a first position in the x-y plane proximate to a first corner of the print bed over the electrically conductive material of the flange; sending a second command to the print bed motion control assembly to move the print bed along the z-axis to the hot end until the electrical circuit is completed by the electrically conductive material of the hot end contacting the electrically conductive material of the flange proximate to the first corner; determining a first height along the z-axis where the hot end contacts the flange to complete the electrical circuit at the first position proximate to the first corner; sending a third command to the hot end motion control assembly to move the hot end to a second position in the x-y plane proximate to a second corner of the print bed over the electrically conductive material of the flange; sending a fourth command to the print bed motion control assembly to move the print bed along the z-axis to the hot end until the electrical circuit is completed by the electrically conductive material of the hot end contacting the electrically conductive material of the flange proximate to the second corner; determining a second height along the z-axis where the hot end contacts the flange to complete the electrical circuit at the second position proximate to the second corner; sending a fifth command to the hot end motion control assembly to move the hot end to a third position in the x-y plane proximate to a third corner of the print bed over the electrically conductive material of the flange; sending a sixth command to the print bed motion control assembly to move the print bed along the z-axis to the hot end until the electrical circuit is completed by the electrically conductive material of the hot end contacting the electrically conductive material of the flange proximate to the third corner; determining a third height along the z-axis where the hot end contacts the flange to complete the electrical circuit at the third position proximate to the third corner; sending a seventh command to the hot end motion control assembly to move the hot end to a fourth position in the x-y plane proximate to a fourth corner of the print bed over the electrically conductive material of the flange;

sending an eighth command to the print bed motion control assembly to move the print bed along the z-axis to the hot end until the electrical circuit is completed by the electrically conductive material of the hot end contacting the electrically conductive material of the flange proximate to the fourth corner; and/or determining a fourth height along the z-axis where the hot end contacts the flange to complete the electrical circuit at the fourth position proximate to the fourth corner. The print bed is moved along the z-axis depending on a position of the hot end in the x-y plane during printing of the three-dimensional object based on the level of the printer bed at the position of the hot end in the x-y plane. According to this disclosure, a method of manufacturing the auto-leveling system for a three-dimensional printer is provided.

According to this disclosure, the system further includes one or more of the following: after determining the first height, the controller is configured to again send the second command to verify the first height when the electrical circuit is again completed by the electrically conductive material of the hot end contacting the electrically conductive material of the flange proximate to the first corner; after determining the second height, the controller is configured to again send the fourth command to verify the second height when the electrical circuit is again completed by the electrically conductive material of the hot end contacting the electrically conductive material of the flange proximate to the second corner; after determining the third height, the controller is configured to again send the sixth command to verify the third height when the electrical circuit is again completed by the electrically conductive material of the hot end contacting the electrically conductive material of the flange proximate to the third corner; after determining the fourth height, the controller is configured to again send the eighth command to verify the fourth height when the electrical circuit is again completed by the electrically conductive material of the hot end contacting the electrically conductive material of the flange proximate to the fourth corner; after determining the first height, the controller is configured to again send at least one of the second, fourth, sixth, or eighth command to verify at least one of the first, second, third, or fourth height, respectively, by again completing the electrical circuit by the electrically conductive material of the hot end contacting the electrically conductive material of the flange proximate to at least one of the first, second, third, or fourth corner, respectively; the electrically conductive material of the hot end comprises aluminum; the electrically conductive material of the bed plate comprises aluminum; the flange is of a uniform thickness, and wherein the controller determines an offset distance to the print glass based on the uniform thickness; the uniform thickness is between about 0.2 to about 10 millimeters; the uniform thickness is about 1.5 millimeters; the flange comprises a first section and a second section, wherein the first section of the flange comprises the first and second corners, and wherein the second section of the flange comprises the third and fourth corners; the wall comprises a first section and a second section, wherein the first section of the wall is connected to the first section of the flange, and wherein the second section of the wall is connected to the second section of the flange; the first section of the wall comprises a planar surface configured to contact the print glass when the print glass is supported by the print bed, wherein the first section of the wall comprises a planar surface configured to contact the print glass when the print glass is supported by the print bed, and wherein the planar surface of the first section is parallel to the planar surface of the second section; the first section is configured to inhibit movement of the print glass in a first direction in the x-y plane, wherein the second section is configured to inhibit movement of the print glass in a second direction in the x-y plane, the second direction parallel to the first direction; the wall comprises a third section configured to inhibit movement of the print glass in a third direction perpendicular to the first and second directions; the third section of the wall comprises a planar surface configured to contact the print glass when the print glass is supported by the print bed, the planar surface of the third wall perpendicular to planar surfaces of the first and second sections of the wall; the bed plate comprises an opening configured to allow the print glass to slide in the x-y plane into the print bed against the heat plate to be supported by the heat plate; the wall comprises the opening; the print bed comprises springs biasing the heat plate away from the base of the bed plate along the z-axis; the heat plate contacts print glass and biases the print glass against the flange to facilitate retaining the print glass in a desired position relative to the print bed when the print glass is positioned on the print bed; the print bed comprises fasteners attaching the heat plate to the bed plate, wherein the springs are positioned coaxially about the fasteners; the print glass is sandwiched between the heat plate and the flange to facilitate positioning the print glass relative to the print bed when the print glass is on the print bed; the heat plate is configured to warm up during printing of the three-dimensional object; the hot end comprises an extruder configured to direct consumable material onto the print glass, the hot end comprising the electrically conductive material; and/or the electrical circuit is completed when electrical circuit can be directed between the electrically conductive material of the hot end and the electrically conductive material of the flange. According to this disclosure, a method of manufacturing the auto-leveling system for a three-dimensional printer is provided.

According to this disclosure, a method of leveling a print bed for a three-dimensional printer includes one or more of the following: moving a hot end of a three-dimensional printer and a print bed of the three-dimensional printer to contact each other at a first position on the print bed, wherein contact between the hot end and the print bed completes an electrical circuit, wherein the hot end is configured to extrude consumable material to build a three-dimensional object, and wherein the print bed is configured to support the three-dimensional object; determining a first height of the print bed at the first position when the hot end and the print bed complete the electrical circuit at the first position; moving the hot end and the print bed to contact each other at a second position on the print bed to complete the electrical circuit; determining a second height of the print bed at the second position when the hot end and the print bed complete the electrical circuit at the second position; moving the hot end and the print bed to contact each other at a third position on the print bed to complete the electrical circuit; determining a third height of the print bed at the third position when the hot end and the print bed complete the electrical circuit at the third position; and/or determining a level of the print bed based on the first, second, and third heights, wherein the determined level of the print bed is used to adjust a height of the print bed depending on a position of the hot end during printing of the three-dimensional object.

According to this disclosure, the method further includes one or more of the following: moving the hot end and the print bed to contact each other at a fourth position on the print bed to complete the electrical circuit; determining a fourth height of the print bed at the fourth position when the hot end and the print bed complete the electrical circuit at the fourth position; and/or determining the level of the print bed based on the first, second, third, and fourth heights; before determining the level of the print bed, the step of moving the hot end and the print bed to contact each other at the fourth position and the step of determining the fourth height of the print bed at the fourth position are repeated to verify the fourth height; the fourth position is proximate to a fourth corner of the print bed; the first position is proximate to a first corner of the print bed; the second position is proximate to a second corner of the print bed; the third position is proximate to a third corner of the print bed; before determining the level of the print bed, the step of moving the hot end and the print bed to contact each other at the first position and the step of determining the first height of the print bed at the first position are repeated to verify the first height; before determining the level of the print bed, the step of moving the hot end and the print bed to contact each other at the second position and the step of determining the second height of the print bed at the second position are repeated to verify the second height; before determining the level of the print bed, the step of moving the hot end and the print bed to contact each other at the third position and the step of determining the third height of the print bed at the third position are repeated to verify the third height; the hot end is moved in an x-y plane, and wherein the print bed is moved in along a z-axis perpendicular to the x-y plane; and/or the hot end comprises an electrically conductive material, wherein the print bed comprises an electrically conductive material, and wherein the electrical circuit is completed when electrical current is passed between the electrically conductive material of the hot end and the electrically conductive material of the print bed upon contact of the print bed to the hot end.

According to this disclosure, a leveling system for a three-dimensional printer includes one or more of the following: an extruder configured to direct consumable material to build a three-dimensional object, the extruder comprising electrically conductive material; a print bed configured to support the three-dimensional object, the print bed comprising electrically conductive material; and/or a controller configured to determine a level of the print bed. The controller is configured to determine a level of the print bed by any of the following: sending one or more signals to move the extruder and the print bed to contact each other at a first position, wherein contact between the extruder and the print bed completes an electrical circuit at the first position by the electrically conductive material of the extruder contacting the electrically conductive material of the print bed; determining a first distance where the extruder contacts the print bed to complete the electrical circuit at the first position; sending one or more signals to move the extruder and the print bed to contact each other at a second position, wherein contact between the extruder and the print bed completes the electrical circuit at the second position by the electrically conductive material of the extruder contacting the electrically conductive material of the print bed; determining a second distance where the extruder contacts the print bed to complete the electrical circuit at the second position; sending one or more signals to move the extruder and the print bed to contact each other at a third position, wherein contact between the extruder and the print bed completes the electrical circuit at the third position by the electrically conductive material of the extruder contacting the electrically conductive material of the print bed; and/or determining a third distance where the extruder contacts the print bed to complete the electrical circuit at the third position. The controller is configured to adjust distance of the print bed based on the determined level of print bed during printing of the three-dimensional object. According to this disclosure, a method of manufacturing the leveling system for a three-dimensional printer is provided.

According to this disclosure, a print bed for a three-dimensional printer includes one or more of the following: a heat plate configured to support a print substrate on which a three-dimensional object is built by a three-dimensional printer; and/or a carriage attached to the bed plate. The carriage includes one or more of the following: a base; and/or one or more channels connected base, wherein the print substrate is between the base and a corresponding surface of the one or more channel when the print substrate is on the heat plate. According to this disclosure, a method of manufacturing the print bed for a three-dimensional printer is provided.

According to this disclosure, the print bed further includes the bed plate is between the base and the corresponding surface of the one or more channels, wherein the one or more channels inhibit movement of the heat plate in a direction away from the base. According to this disclosure, a method of manufacturing the print bed for a three-dimensional printer is provided.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DETAILED DESCRIPTION

Figure 1:
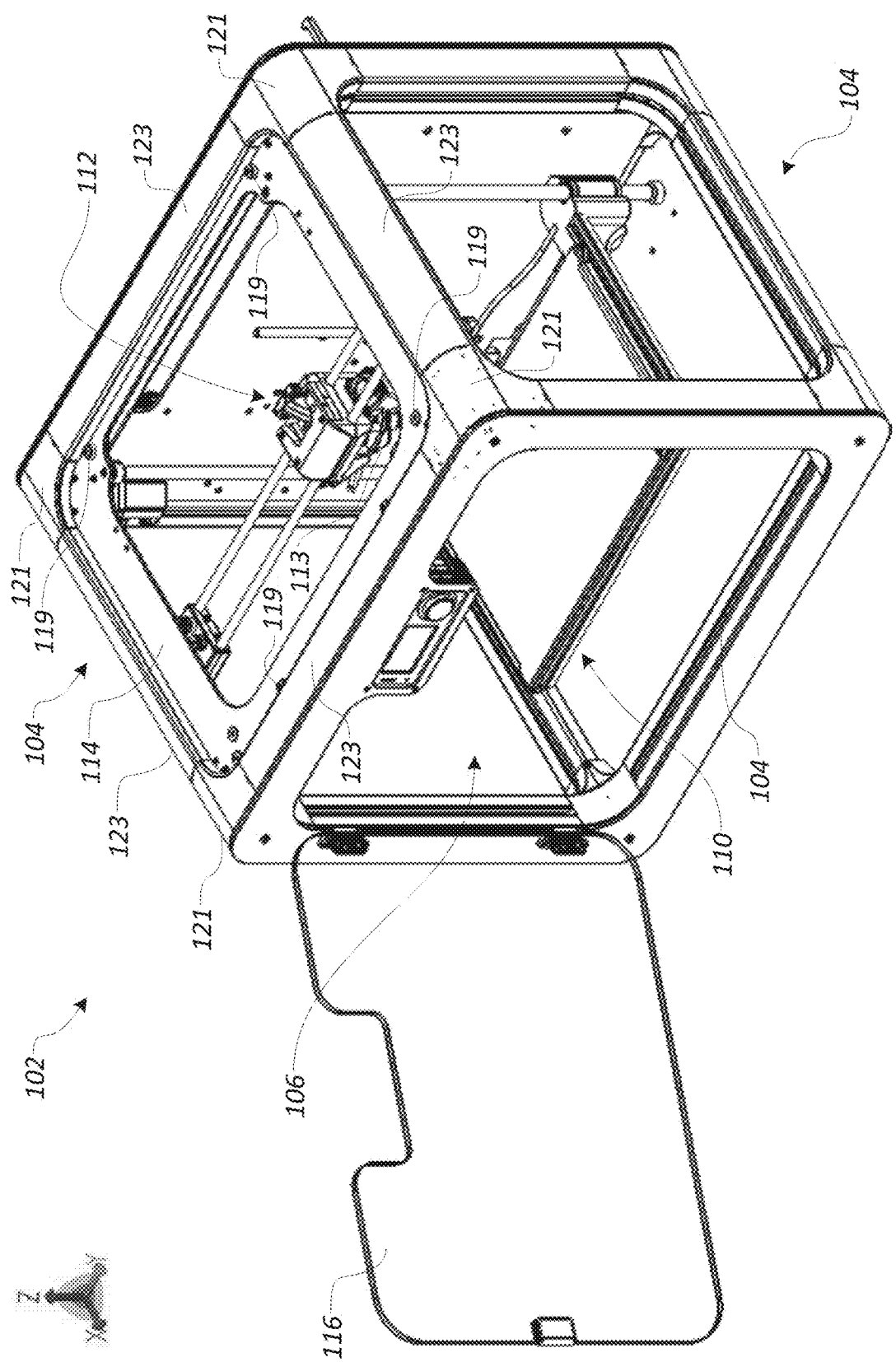
FIG. 1 illustrates a side, top, perspective view of an embodiment of a three-dimensional (3D) printer.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

In particular, embodiments disclosed herein pertain to devices, including printers, print head decks, and print beds, which provide improved accuracy, precision, reliability/longevity, and ease of maintenance and replacement.

FIG. 1 illustrates a side, top, perspective view of an embodiment of a three-dimensional (3D) printer 102. As illustrated in FIG. 1, the printer 102 can have an enclosure or casing 104. The enclosure 104 can define the outer boundaries (e.g., perimeter) of the printer 102. The enclosure 104 can be made for any suitable material that provides desired or predetermined rigidity for the printer 102 and support of the components and build object (e.g., 3D printed part) as discussed herein. The materials can include polymers such as integrally thermoformed plastic, for example, acrylic, polycarbonate, glass-reinforced polycarbonate, acrylonitrile butadiene styrene (ABS), or other materials with sufficient or desired level of impact resistance, toughness, and heat resistance. The materials can include metals and metal alloys, for example, aluminum, stainless steel, or other metals.

The enclosure 104 can define and support a build chamber 106. The build chamber 106 can contain a bed 110 (e.g., a printing bed, print bed, or printing surface) and an extrusion assembly 112 for building a 3D model, object, or part. The bed 110 is a platform on which 3D object is built and can move along a vertical z-axis as illustrated in FIG. 1 based on signals provided from a computer-operated controller. The bed 110 may include a heat plate and a print/printing surface such as borosilicate glass. The glass may be coated with polyethylene terephthalate (PET) tape, Kapton tape, blue painter's tape, or a solution to enhance adhesion between the printed part (e.g., 3D object) and the bed 110. The extrusion assembly 112 may include one or more extruders, extrusion heads, or hot ends 113 (having nozzles) for melting and extruding successive portions of filaments (e.g., consumable material) during a build operation with the printer 102. Extrusion assembly 112 features and functions are disclosed in further detail in U.S. application Ser. No. 15/029,197, which is incorporated by reference and made a part of this specification.

Movement of the extrusion assembly 112 can be supported by a frame, framework, or cage 114 connected to the enclosure 104. The extrusion assembly 112 can move along a horizontal x-y plane based on signals provided from a computer-operated controller. The controller can be one or more processor-based controllers, which may communicate with parts or components of the printer 102 to build a 3D object as discussed herein.

The horizontal x-y plane is a plane defined by an x-axis (x direction) and a y-axis (y direction) as illustrated in FIG. 1, where the x-axis, the y-axis, and the z-axis are orthogonal to each other. The z-axis is orthogonal to the x-y plane. In some embodiments, the bed 110 may be configured to move in the horizontal x-y plane within build chamber 106, and the extrusion assembly 112 may be configured to move along the z-axis. Other similar arrangements may also be used such that one or both of the bed 110 and the extrusion assembly 112 are moveable relative to each other.

As illustrated in FIG. 1, the build chamber 106 can be enclosed from ambient conditions, using for example, a door 116. In some embodiments, the build chamber 106 can be partially open to ambient conditions. In some embodiments, the build chamber 106 may be omitted and/or replaced with different types of build environments. For example, the build chamber 106 may be substantially closed or sealed from the environment. The build chamber 106 may be enclosed with suitable structures (e.g., flexible curtains, rigid transparent material, such as plexiglass, etc.) as desired. In some embodiments, the build chamber 106 may also be heatable in a variety of manners (e.g., with heated circulating air, heat lamps, and the like) to, for example, reduce the rate at which the 3D object solidifies after being extruded and deposited (e.g., to reduce distortions, cracking and curling). Alternatively, or in combination, the bed 110 may be heated to promote adhesion of the extruded material to the build surface and to reduce the rate at which the 3D object solidifies after being extruded and deposited as discussed herein.

Figure 2:
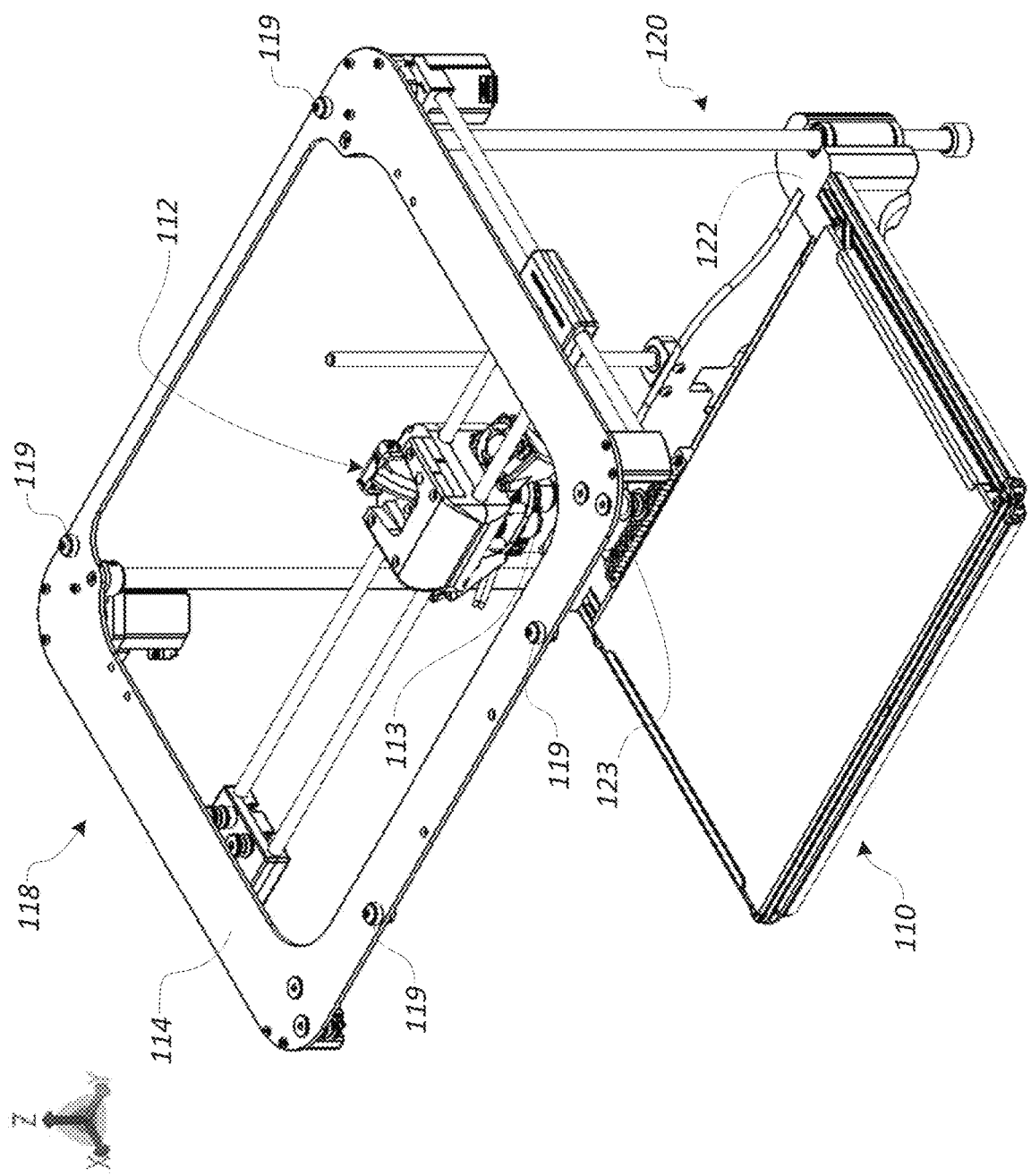
FIG. 2 illustrates a side, top, perspective view of embodiments of various assemblies of the printer.

FIG. 2 illustrates a side, top, perspective view of embodiments of various assemblies of the printer 102. As illustrated in FIG. 2, the extrusion assembly 112 can be supported and guided by an extrusion guide assembly, extrusion assembly movement system, or hot end motion control assembly 118. The bed 110 can be supported and guided by a bed guide assembly or print bed motion control assembly 120, which includes bed bracket assemblies 122 supporting the bed 110 in, for example, a cantilevered position as discussed in U.S. application Ser. No. 15/029,197.

As illustrated in FIG. 2, the printer 102 can have a brush 123 connected to the bed 110 or bed guide assembly 120. The brush 123 can be positioned such that the hot end 113 of the extrusion assembly 112 may be brushed or passed through the brush 123 to clean the hot end 113 before beginning to print a 3D object or auto-level as discussed herein. The brush 123 can be made of any suitable polymer or metallic material.

Extrusion Guide Systems and Methods

Figure 3:
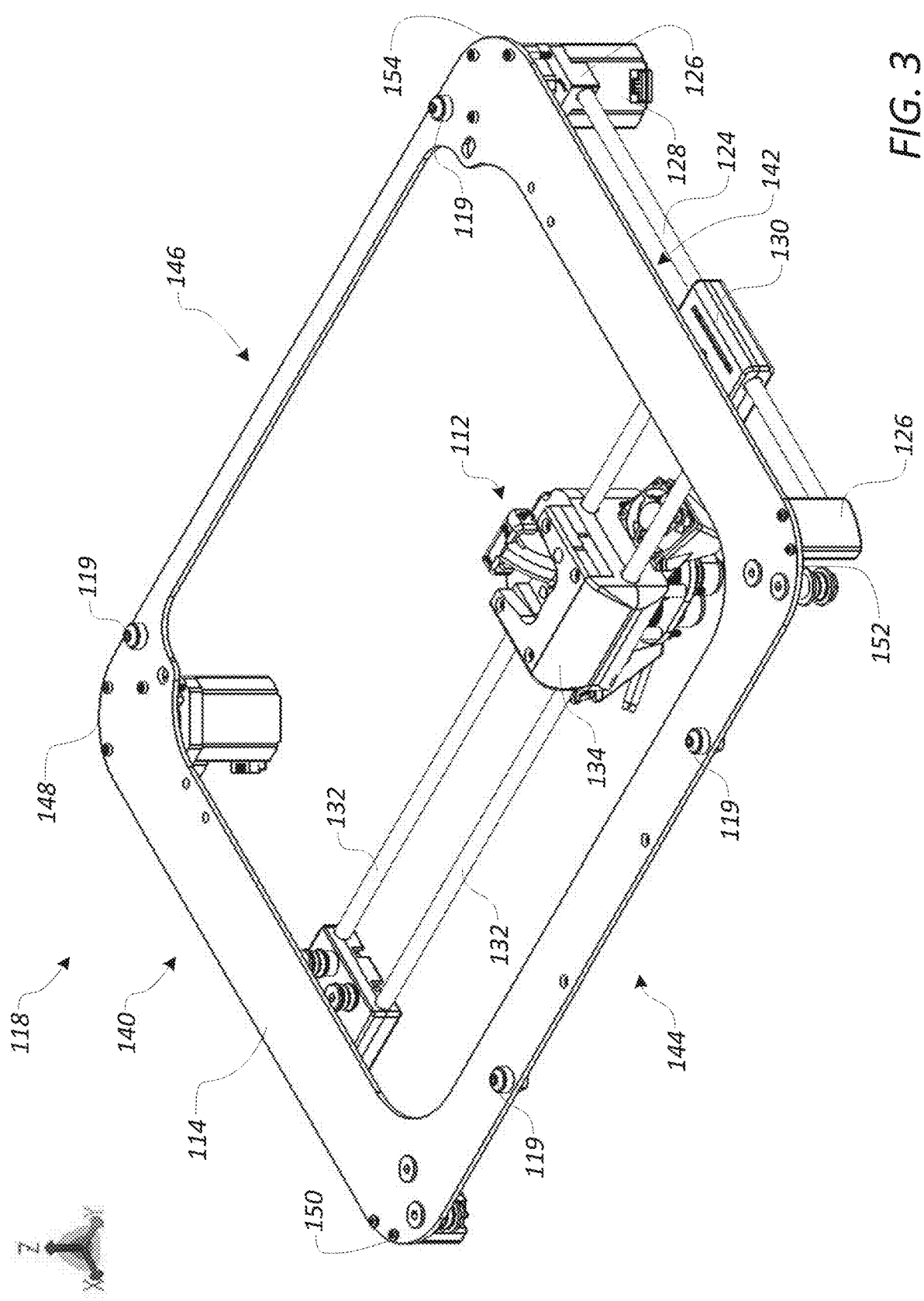
FIG. 3 illustrates a side, top, perspective view of an embodiment of an extrusion guide assembly.
Figure 4:
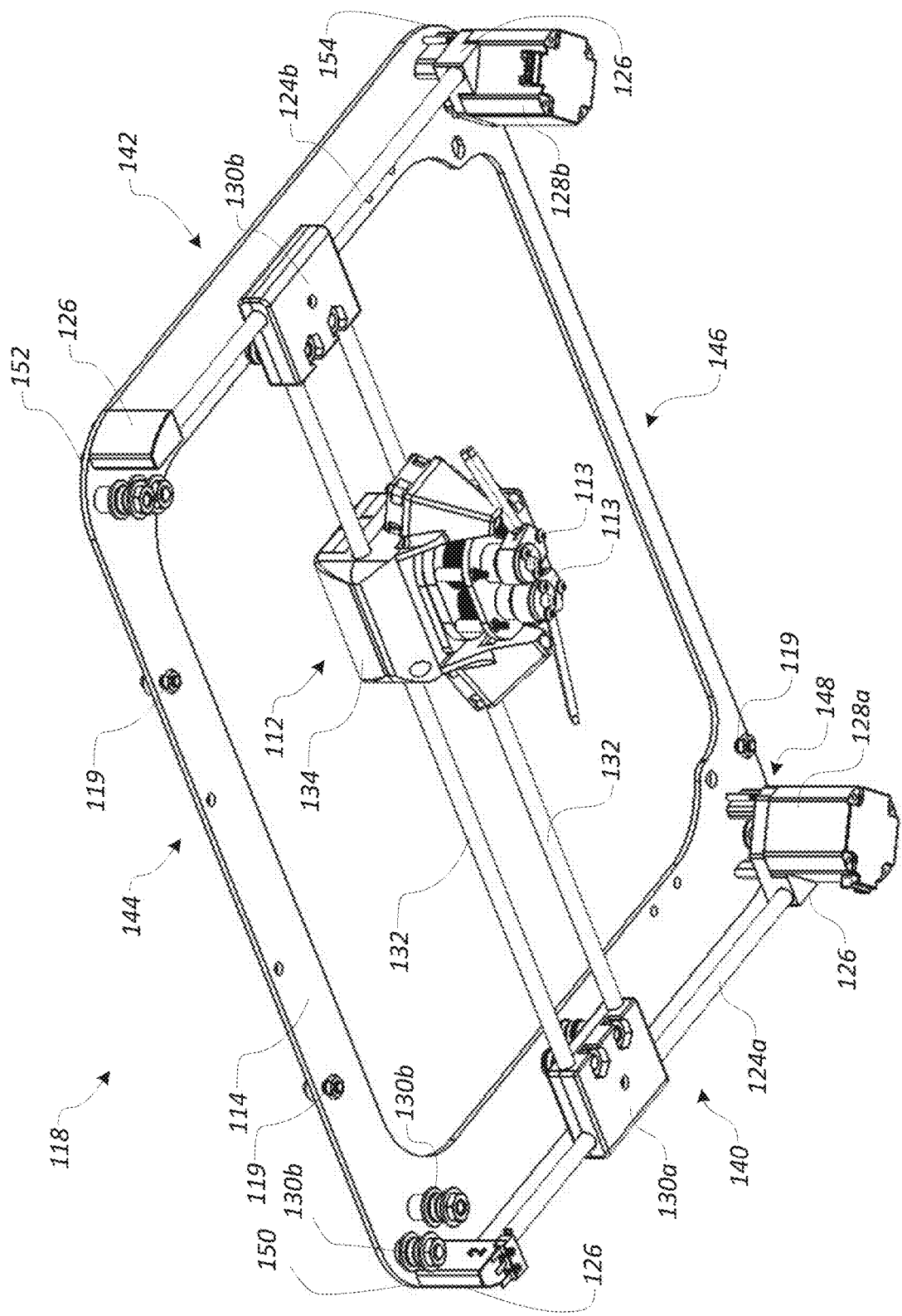
FIG. 4 illustrates a side, bottom, perspective view of an embodiment of the extrusion guide assembly.
Figure 5:
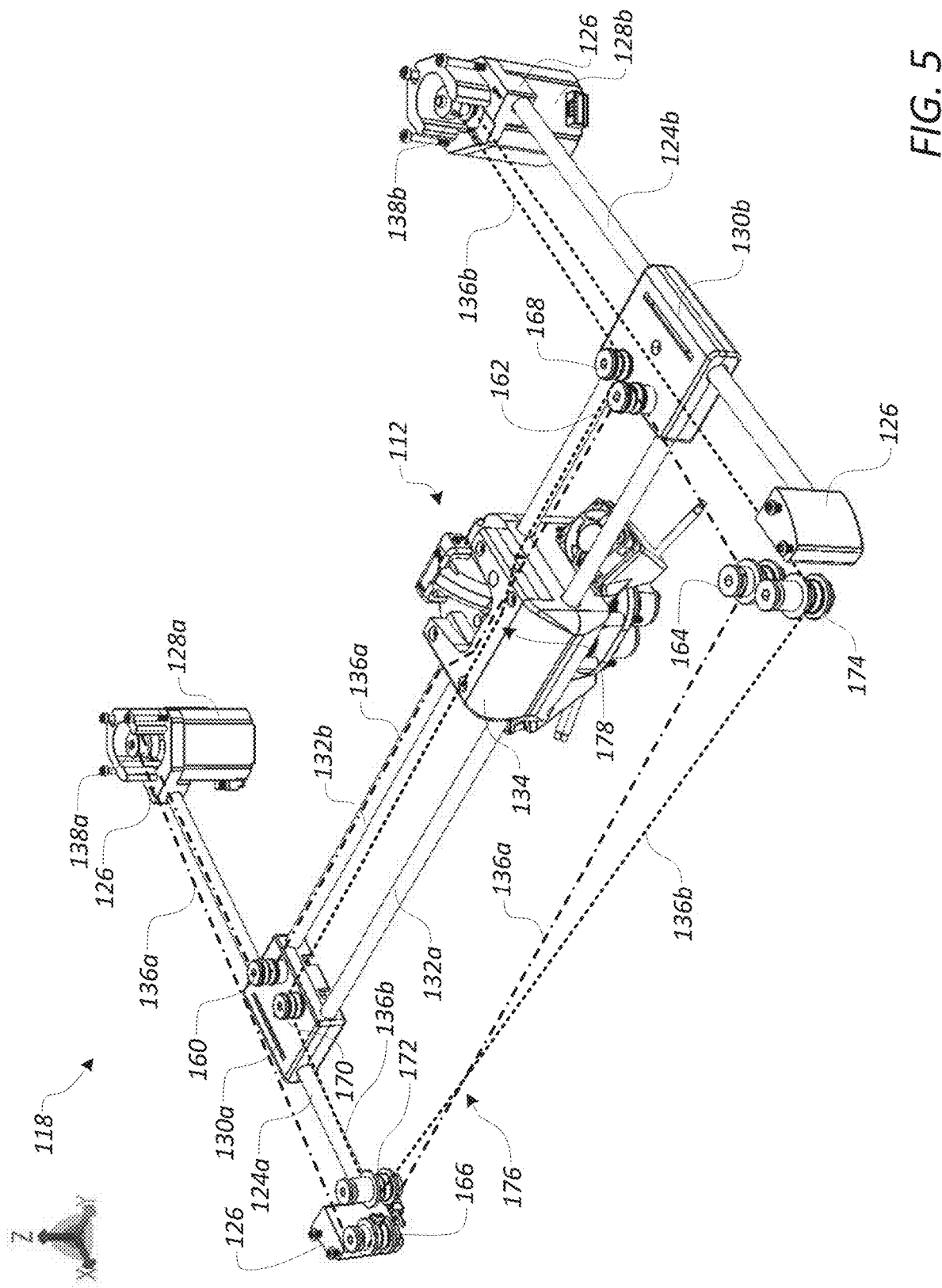
FIG. 5 is a side, top, perspective view of an embodiment of the extrusion guide assembly with some features not shown for illustration purposes.
Figure 6:
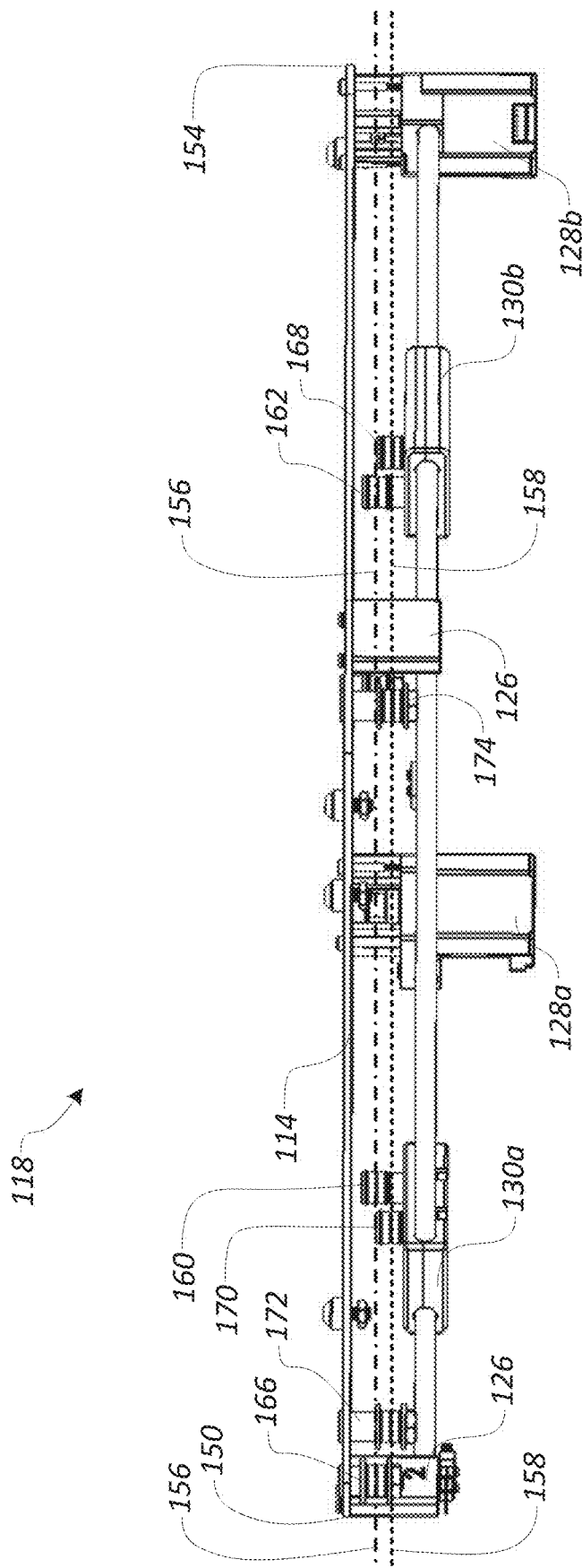
FIG. 6 is a first side view of an embodiment of the extrusion guide assembly.
Figure 7:
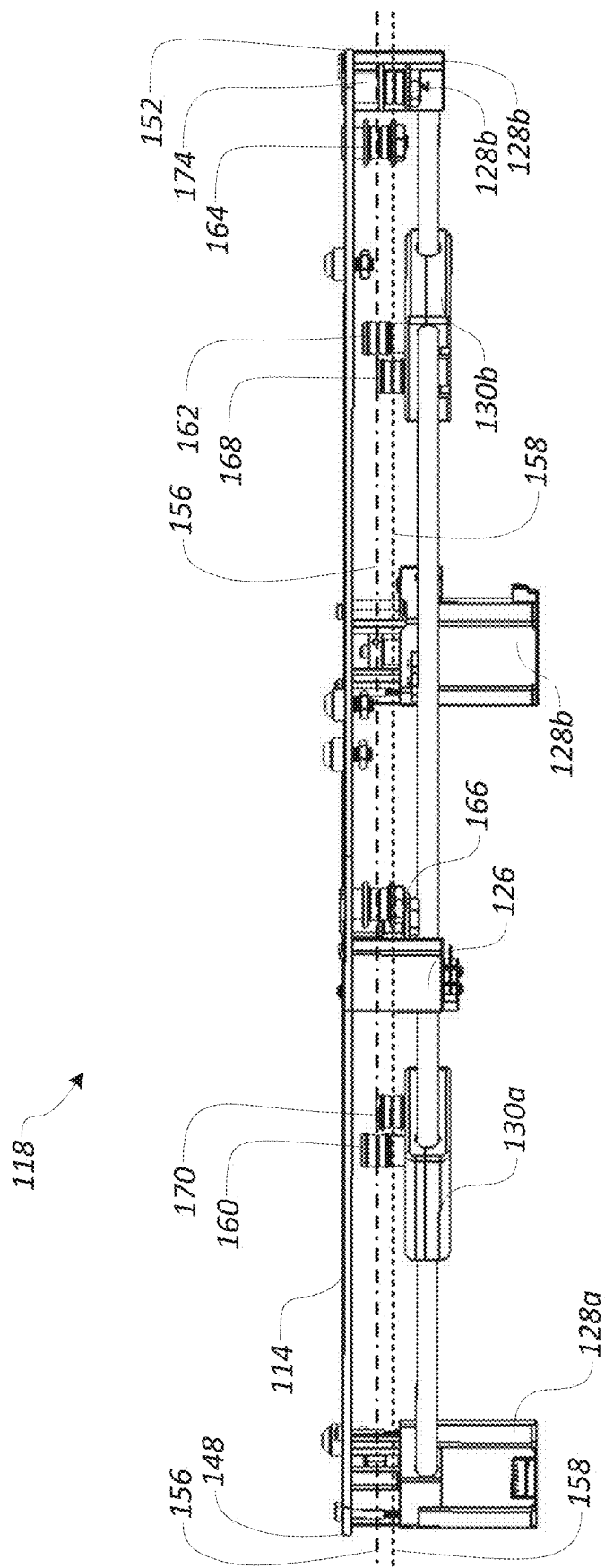
FIG. 7 is a second side view of an embodiment of the extrusion guide assembly.

FIG. 3 illustrates a side, top, perspective of an embodiment of a extrusion guide assembly 118. FIG. 4 illustrates a side, bottom, perspective view of an embodiment of the extrusion guide assembly 118. FIG. 5 is a side, top, perspective view of an embodiment of the extrusion guide assembly 118 with some features not shown for illustration purposes. In particular, the frame 114 is not shown for illustration purposes. FIG. 6 is a first side view of an embodiment of the extrusion guide assembly 118. FIG. 7 is a second side view of an embodiment of the extrusion guide assembly 118.

As discussed herein, the components of the extrusion guide assembly or extrusion assembly movement system 118 can be connected, attached, or mated to the frame 114 either directly or indirectly. Accordingly, the extrusion guide assembly 118 can be installed onto the printer 102 by securing the frame 114 to, for example, the enclosure 104 or any other suitable part of the printer 102. The extrusion guide assembly 118 can be modular and removed from the printer 102 as a single unit. For example, by removing the connections between the frame 114 and the printer 102, the extrusion guide assembly 118 can be removed from the printer 102 via the frame 114 (removing the frame 114 and all attached components) as desired to, for example, perform maintenance or replace entirely with another extrusion guide assembly 118. As shown in FIG. 1, four fasteners (e.g., nut and bolt assemblies) 119 or any other suitable fastening mechanism can couple, attach, connect, and/or mate the extrusion guide assembly 118 via, for example, the frame 114 to the enclosure 104 (e.g. a support bracket formed in the x-y plane of the enclosure 104) of the printer 102. The support bracket (e.g., an opening, cutout, and/or indentation with a support flange or lip in a top portion of the enclosure 104) can be located within the corner brackets 121 and extrusion members 123. When the extrusion guide assembly 118 is installed in the printer 102, other components such as a structure to enclose the build chamber 106 as discussed herein can be coupled, attached, connected, and/or mated over and/or onto to the extrusion guide assembly 118.

In some embodiments, the extrusion guide assent or extrusion assembly movement system 118 may be movable in the z direction (z-axis). In this configuration, the extrusion guide assembly or extrusion movement system 118 may lower to the build surface to start a print and raise (move or move upwards along the z-axis as well as in the x-y plane as discussed herein) as the 3D object is formed. In this configuration, the load on the z-axis remains approximately the same over the course of the print, promoting consistent layering along the z direction, regardless of the weight of the 3D printed object. In the same configuration, the bed assembly 110 may be fixed along the z direction. In such an arrangement, the bed assembly can be configured to support higher dynamic and static loads on the build surface than when the bed assembly 110 designed to be moveable. For instance, all four corners of the bed assembly could be fixed to the printer frame, rather than cantilevered about linear guides or bearings.

The extrusion guide assembly or extrusion assembly movement system 118 can include one or more x-side rods or tracks 124 (e.g., a first rod 124a and a second rod 124b) supported by two mounts 126. The mounts 126 can be connected directly to the frame 114 and/or be connected to/mounted onto motors 128 of the extrusion guide assembly 118 (e.g., a first motor 128a and a second motor 128b).

The x-side rods 124 can support and guide one or more y-rod holders, braces, or supports 130 (e.g., a first brace 130a and a second brace 130b). The y-rod holders 130 can support and guide one or more y-extrusion rods or tracks 132 (e.g., a third rod 132a and a fourth rod 132b). The y-extrusion rods 132 can support and guide the extrusion assembly 112 as discussed herein.

The y-rod holders 130 and an extrusion housing 134 of the extrusion assembly 112 can move, slide, or translate on the x-side rods 124 and y-extrusion rods 132, respectively. For example, the y-rod holders 130 and extrusion housing 134 can move along a longitudinal length of the x-side rods 124 and y-extrusion rods 132, respectively. The y-rod holders 130 and extrusion housing 134 can be substantially leveled and straight (e.g., within predetermined tolerances) to maintain or keep the y-rod holders 130 and extrusion housing 134 in a predetermined x-y plane. The y-rod holder 130 and extrusion housing 134 can be made of any suitable material including polymers such as plastics and/or metal such as die cast or stamp-pressed aluminum, including aluminum alloys. Other suitable materials can include any suitable form or alloy of cast or wrought iron or carbon steel, including stainless steel. In some embodiments, the extrusion guide assembly or extrusion assembly movement system 118 may incorporate linear guides in combination with or in place of linear rods for increased precision and/or increased load-carrying capacity.

Movement of the y-rod holders 130 and extrusion housing 134 can be provided by belts (e.g., positioned along a first belt line 136a and a second belt line 136b) or other suitable flexible attachment mechanism along belt lines 136. FIG. 5 shows belt lines 136 as dashed lines with the two varying dashed patterns illustrating paths along which belts (e.g., toothed belts) can be suspended, looped, and/or positioned as discussed herein. Accordingly, two belts can be used as illustrated in FIG. 5 to move the extrusion assembly 112. The belts along the belt lines 136 can be continuous. The belts can be manufactured using endless construction. In some embodiments, belt ends can be connected to form a complete and continuous loop (e.g., the belt ends can be connected at the extrusion housing 134).

The belts can be connected to, for example, shafts or gears 138 of the motors 128. The belts along the belt lines 136 can be positioned (e.g., suspended) around or about the gears 138 with teeth that mate with corresponding teeth on the belts to move the belts along the belt lines 136. As the motors 128 are powered and controlled to spin at desired speeds and directions, the belts are moved along belt lines 136 as discussed herein.

The following frame of reference can be provided to describe placement of the belts along the belt lines 136 and/or movement of the extrusion assembly 112. While particular numerals are provided to correspond to certain features (e.g., a "first" side), it is understood that this is provided for discussion purposes and any desired or convenient numerals can be used to describe the frame of reference.

With reference to, for example, FIGS. 3 and 4, The frame 114 of the extrusion guide assembly 118 can have a first side 140 extending along the x-axis. The first side 140 can correspond to a first side of the printer 102. The frame 114 can have a second side 142 extending along the x-axis. The second side 142 can be opposite the first side 140 along the y-axis. The second side 142 can correspond to a second side of the printer 102. The frame 114 can have a third side 144 extending along the y-axis. The third side 144 can extend between and connect the first and second sides 140, 142. The third side 144 can correspond to a third side of the printer 102. The frame 114 can have a fourth side 146 extending along the y-axis. The fourth side 146 can be opposite the third side 144 along the x-axis. The fourth side 146 can extend between and connect the first and second sides 140, 142. The fourth side 146 can correspond to a fourth side of the printer 102.

Accordingly, the frame 114 can have a first corner 148 proximate to a position where the first and fourth sides 140, 146 connect or intersect. The first corner 148 can correspond to a first corner of the printer 102. The frame 114 can have a second corner 150 proximate to a position where the first and third sides 140, 144 connect or intersect. The second corner 150 can correspond to a second corner of the printer 102. The frame 114 can have a third corner 152 proximate to a position where the second and third sides 142, 144 connect or intersect. The third corner 152 can correspond to a third corner of the printer 102. The frame 114 can have a fourth corner 154 proximate to a position where the third and fourth sides 144, 146 connect or intersect. The fourth corner 154 can correspond to a fourth corner of the printer 102.

The extrusion guide assembly 118 can have a plurality of rotating shafts about which the belts are positioned, suspended, or looped along belt lines 136. The rotating shafts can be any suitable mechanism for efficiently providing support for a belt while allowing for a rotation about a central axis of the corresponding rotating shaft. In some embodiments, the rotating shafts can include one or more of the following: a pulley, a gear, or a bearing.

As illustrated in FIGS. 6 and 7, the rotating shafts can be positioned along planes to correspondingly position a belt in a particular plane along the belt lines 136. For example, an area or point of contact between the rotating shafts and the belts can be positioned along a particular plane to position the belt in the particular plane along the belt lines 136. A first plurality of rotating shafts as discussed herein can be positioned along a first plane 156. When a belt is positioned about the first plurality of rotating shafts (along the first belt line 136a as discussed herein), the belt is positioned and extends in the first plane 156. The first plane 156 is illustrated in FIGS. 6 and 7 with a dashed pattern that corresponds to the dashed pattern for the first belt line 136a as illustrated in FIG. 5. A second plurality of rotating shafts as discussed herein can be positioned along a second plane 158. When a belt is positioned about the second plurality of rotating shafts (along the second belt line 136b as discussed herein), the belt is positioned and extends in the second plane 158. The second plane 158 is illustrated in FIGS. 6 and 7 with a dashed pattern that corresponds to the dashed pattern for the second belt line 136b as illustrated in FIG. 5. Accordingly, the rotating shafts rotate and/or spin about corresponding central axes that are perpendicular to the first and second planes 156, 158 (the corresponding central axes extend along the z-axis).

The first plurality of rotating shafts can include a first rotating shaft 160 positioned on and connected to the first y-rod holder 130. The first rotating shaft 160 can be positioned in the first plane 156. The first plurality of rotating shafts can include a second rotating shaft 162 positioned on and connected to the second y-rod holder 130b. The second rotating shaft 162 can be positioned in the first plane 156. The first plurality of rotating shafts can include a third rotating shaft 164 positioned proximate to the third corner 152. The third rotating shaft 164 can be connected to the frame 114. The third rotating shaft 164 can be positioned in the first plane 156. The first plurality of rotating shafts can include a fourth rotating shaft 166 positioned proximate to the second corner 150. The fourth rotating shaft 166 can be connected to the frame 114. The fourth rotating shaft 166 can be positioned in the first plane 156. As illustrated in FIG. 5, a first belt can extend along the first belt line 136a in the following manner: the first belt extends from the first motor 128a to the first rotating shaft 160, from the first rotating shaft 160 to the second rotating shaft 162, from the second rotating shaft 162 to the third rotating shaft 164, from the third rotating shaft 164 to the fourth rotating shaft 166, and from the fourth rotating shaft 166 back to the first motor 128a. As the first motor 128a spins its gear 138a, the first belt moves about the first, second, third, and fourth rotating shafts 160, 162, 164, 166 along the first belt line 136a.

The second plurality of rotating shafts can include a fifth rotating shaft 168 positioned on and connected to the second y-rod holder 130b. The fifth rotating shaft 168 can be positioned in the second plane 158. The second plurality of rotating shafts can include a sixth rotating shaft 170 positioned on and connected to the first y-rod holder 130a. The sixth rotating shaft 170 can be positioned in the second plane 158. The second plurality of rotating shafts can include a seventh rotating shaft 172 positioned proximate to the second corner 150. The seventh rotating shaft 172 can be connected to the frame 114. The seventh rotating shaft 172 can be positioned in the second plane 158. The second plurality of rotating shafts can include an eighth rotating shaft 174 positioned proximate to the third corner 152. The eighth rotating shaft 174 can be connected to the frame 114. The eighth rotating shaft 174 can be positioned in the second plane 158. As illustrated in FIG. 5, a second belt can extend along the second belt line 136b in the following manner: the second belt extends from the second motor 128b to the fifth rotating shaft 168, from the fifth rotating shaft 168 to the sixth rotating shaft 170, from the sixth rotating shaft 170 to the seventh rotating shaft 172, from the seventh rotating shaft 172 to the eighth rotating shaft 174, and from the eighth rotating shaft 174 hack to the second motor 128b. As the second motor 128b spins its gear 138b, the second belt moves about the fifth, sixth, seventh, and eighth rotating shafts 168, 170, 172, 174 along the second belt line 136b.

As illustrated in FIG. 5, the first and second belt lines 136a, 136b can intersect 176 at an extent proximate to the third side 144. Stated differently, the extents of the belts along the belt lines 136a, 136b between the third and fourth rotating shafts 164, 166 and between the seventh and eight rotating shafts 172, 174 can intersect when the belt lines 136a, 136 are projected on the first plane 156, the second plane 158, or the x-y plane. The (first) intersection 176 can allow for the routing of belts along belt lines 136 about the rotating shafts while keeping the belts in corresponding same planes as discussed herein. For example, the intersection. 176 can facilitate the various faces and surfaces of the belts along belt lines 136a, 136b remaining oriented in the same way or manner with respect to the first plane 156, the second plane 158, or the x-y plane to mitigate uneven wear on the belts.

As illustrated in FIG. 5, the first and second belt lines 136a, 136b can intersect 178 while passing through (and being fixedly coupled to as discussed herein) the extrusion housing 134. Stated differently, the extents of the belts along the belt lines 136a, 136b between the first and second rotating shafts 160, 162 and between the fifth and sixth rotating shafts 168, 170 can intersect when the belt lines 136a, 136b are projected on the first plane 156, the second plane 158, or the x-y plane. The (second) intersection 178 can allow for the routing of belts along belt lines 136 about the rotating shafts while keeping the belts in corresponding same planes as discussed herein without needing to twist the belts. For example, the intersection 178 can facilitate the various faces and surfaces of the belts along belt lines 136a, 136b remaining oriented in the same way or manner with respect to the first plane 156, the second plane 158, or the x-y plane to mitigate uneven wear on the belts.

Accordingly, when the first and second motors 128a, 128b spin or rotate their shafts 138a, 138b in the same direction (e.g., both shafts 138 spinning clockwise or counterclockwise), the belts along belt lines 136 move the extrusion assembly 112 in the y-axis along the y-extrusion rods 132

(e.g., between the first and second sides 140, 142). The extrusion assembly 112 can linear translate or slide on the y-extrusion rods 132. When the first and second motors 128a, 128b spin or rotate in opposite directions (e.g., one spins clockwise and the other spins counterclockwise), the belts along belt lines 136 move the y-rod holders 130 in the x-axis along the x-side rods 124. The y-rod holders 130 can linear translate or slide on the x-side rods 124. As the y-rod holders 130 move along the x-side rods 124, y-rod holders 130 move the y-extrusion rods 132 in the x-axis. Correspondingly, the y-extrusion rods 132 move the extrusion assembly 112 in the x-axis (e.g., between the third and fourth sides 144, 146). A controller of the 3D printer can control the motors to spin their shafts with a combination of one of the shafts 138 not spinning or the same or opposite direction spinning to move the extrusion assembly 112 in the x-y plane as desired. For example, when one of the shafts 138 is spinning and one of the shafts 138 is not spinning, the extrusion assembly 112 is moved along both the x-axis and the y-axis (e.g., the extrusion assembly 112 is moved diagonally between the first corner 148 and the third corner 152 or between the second corner 150 and the fourth corner 154). Thus, the extrusion assembly 112 can be moved in the x-y plane by the extrusion guide assembly 118 while the extrusion assembly 112 places roads of material as needed to build the 3D object. For example, consumable materials are heated and then deposited onto the bed 110 to build the 3D object using layer-based additive manufacturing as discussed herein.

Auto-Leveling Systems and Methods

Figure 8:
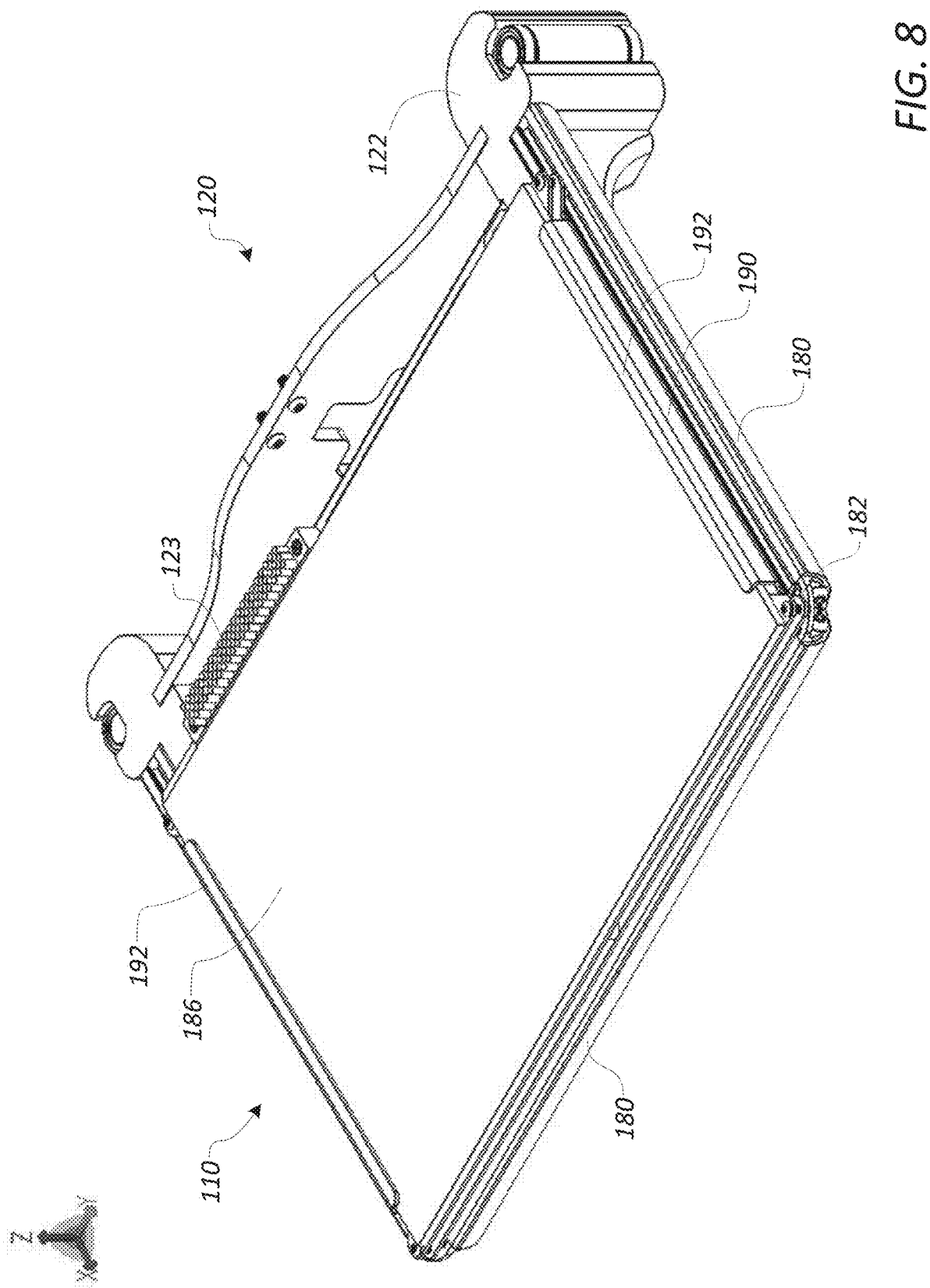
FIG. 8 illustrates a side, top, perspective view of an embodiment of a bed assembly and a bed guide assembly.
Figure 9:
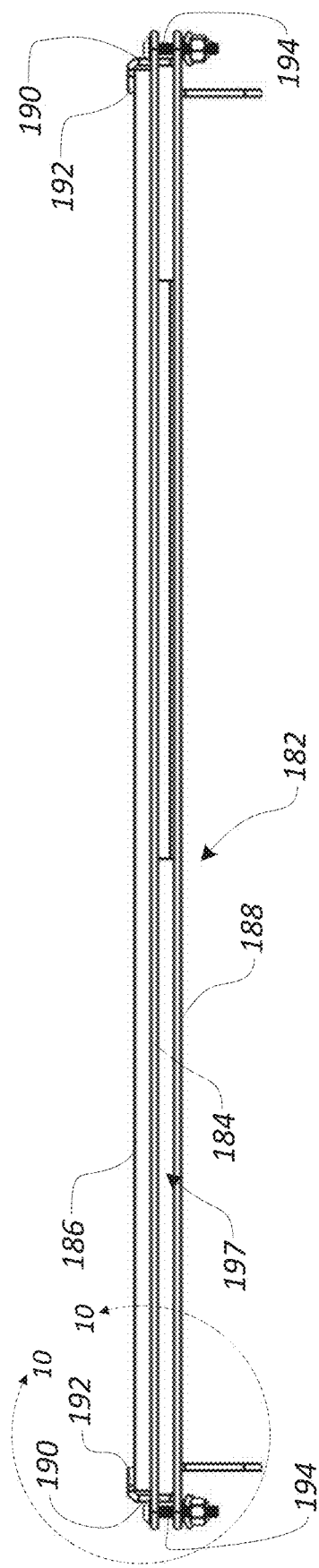
FIG. 9 illustrates a front view of an embodiment of a bed assembly with some features not shown for illustration purposes.

FIG. 8 illustrates a side, top, perspective view of an embodiment of a bed or bed assembly 110 connected to a bed guide assembly or bed movement system 120. FIG. 9 illustrates a front view of an embodiment of a bed assembly 110 with some features not shown for illustration purposes. The bed assembly 110 can include a support structure 180 that connects, attaches, or mates to the bed guide assembly 120. The support structure 180 can position and provide support to a bed plate or carriage 182. The bed plate 182 can be connected to a heat plate 184. The heat plate 184 can position and provide support to a printing surface or print glass 186. The heat plate 184 can heat up to keep the 3D object warm during printing to inhibit or prevent curling up of the edges of the base of the 3D object. Curling may result from lower temperatures at the sides of the 3D object during printing. The cooled sides may shrink in relation to the center of the 3D object. The bed 110 being heated may help inhibit or substantially prevent curling at the sides. The heat plate 184 may incorporate or have a heating pad (e.g., heating elements) made from, for example, a printed circuit board with copper traces. In some embodiments, the heat plate may be omitted to minimize cost such as when working with materials such a PLA, TPE, and TPU.

Figure 10:
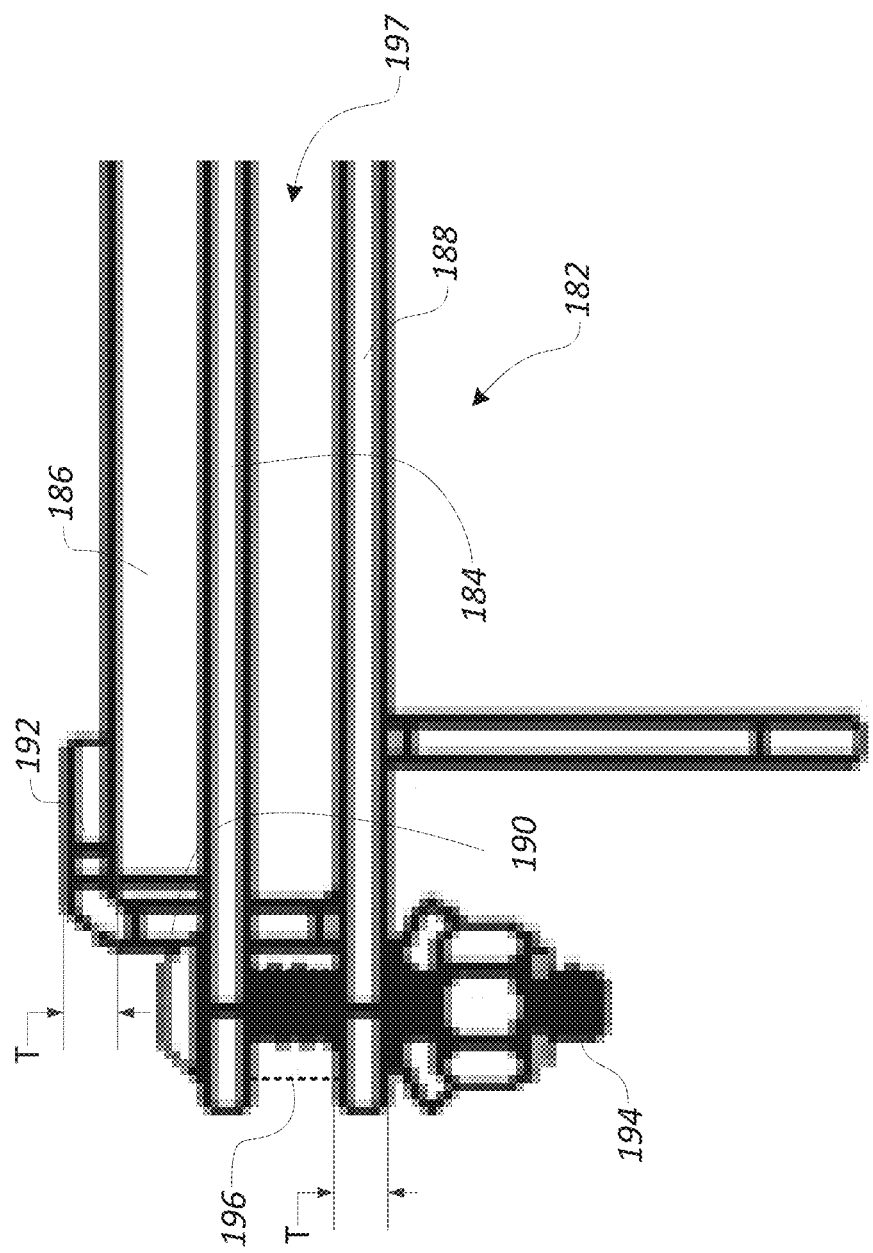
FIG. 10 illustrates a view of section 10-10 in FIG. 9.
Figure 11:
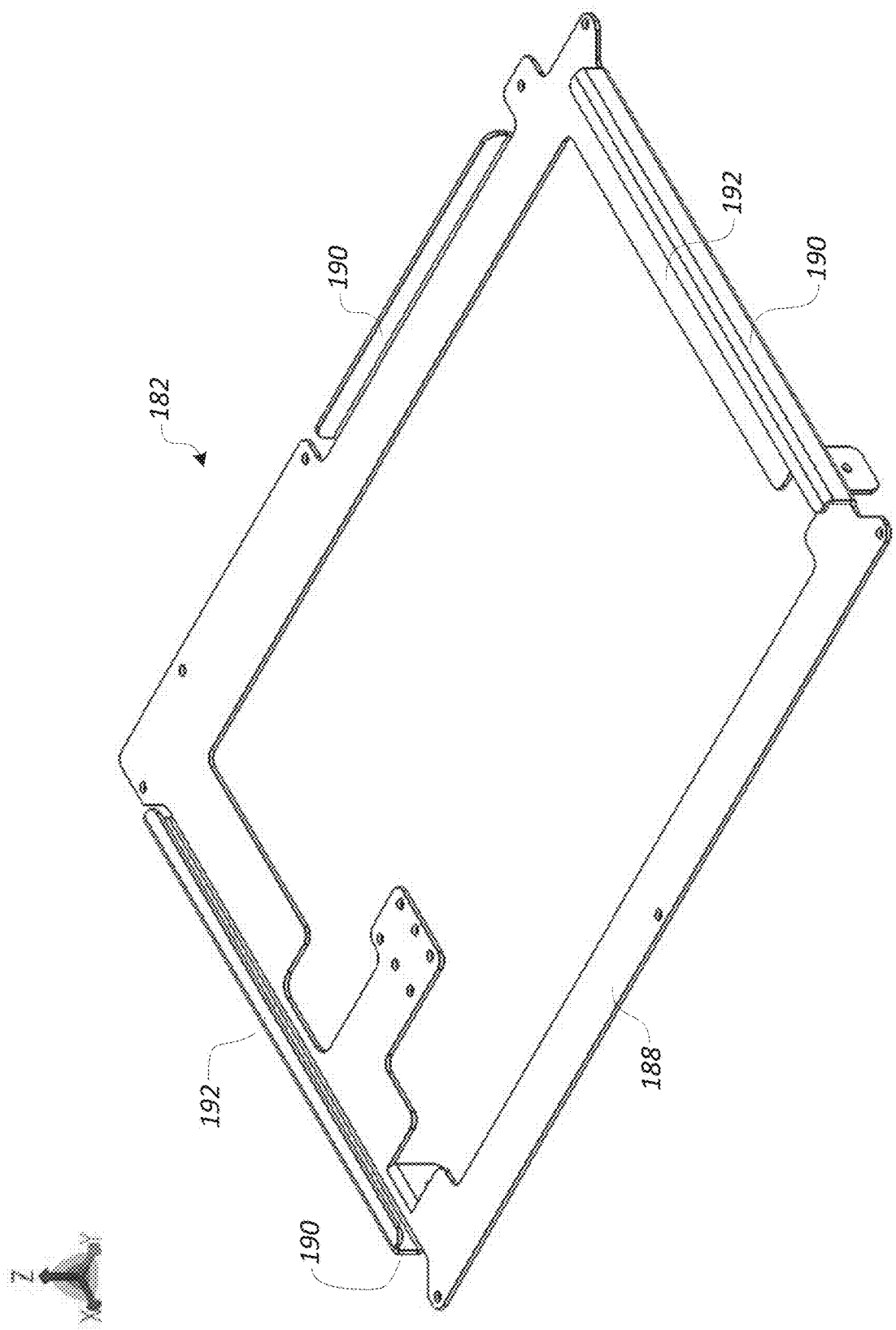
FIG. 11 illustrates a side, top, perspective view of an embodiment of a bed plate.

FIG. 10 illustrates a view of section 10-10 in FIG. 9. For example, FIG. 10 shows the bed assembly 110 without the support structure 180 and the bed guide assembly 120. FIG. 11 illustrates a side, top, perspective view of an embodiment of the bed plate 182.

The bed plate 182 can have a base 188. The base 188 can be connected to the support structure 180. The bed plate 182 can have one or more walls 190 extending from the base 188 substantially perpendicular to a planar surface of the base 188. The one or more walls 190 can extend substantially along the Z axis. The bed plate 182 can have one or more flanges or lip 192 extending from the one or more walls 190 along the x-y plane.

The bed plate 182 can be connected to the heat plate 184 via one or more fasteners 194 (e.g., a bolt and nut assembly). Biasing members or springs 196 can be coaxially positioned about the fasteners 194. The heat plate 184 is connected to the bed plate 182 such that the biasing members 196 can push or bias the heat plate 184 away from the bed plate 182 (e.g., bias the heat plate 184 away from a planar surface of the base 188 of the bed plate 182 to create a void or empty space 197 between the bed plate 182/base 188 and heat plate 184). The range or extent of movement of the heat plate 184 relative to the base 188 along the Z axis can be limited by an extent or link of the fasteners 194 from the planar surface of the base 188. Additionally or alternatively, the range of extent of movement of the heat plate 184 relative to the base 188 along the Z axis can be limited by an extent or distance of the planar surfaces of the flanges 192 from the planar surface of the base 188. For example, surfaces or portions of the heat plate 184 can come against or abut the flanges 192 to limit further motion of the heat plate 184 away from the base 188 along the z-axis. The distance of the planar surfaces of the flanges 192 from the planar surface of the base 188 can substantially correspond to an extent or link of the one or more walls 190 from the base 188.

When the print glass 186 is positioned onto the heat plate 184, the print glass 186 can be positioned between the heat plate 184 and the flanges 192. The heat plate 184 can bias surfaces or portions of the print glass 186 against the flanges 192. Accordingly, the print glass 186 can be securely sandwiched between the heat plate 184 and the flanges 192 to help secure the print glass 186 to the print bed 110 without needing to use other type of fastening mechanisms such as clips.

As illustrated in FIG. 11, the bed plate 182 can have one or more walls 190 that are connected to flanges 192. As also illustrated in FIG. 11, the bed plate 182 can have one or more walls 190 that are not connected to flanges 192. The one or more walls 190a, 190b can be positioned to inhibit movement of the print glass 186 in the x-y plane along three directions (e.g., along the y-axis in both directions and along the x-axis in one direction) while allowing movement of the print glass 186 in a fourth direction (e.g., in opposite direction in the x-axis). Accordingly, the one or more walls 190 and one or more flanges 192 can position and limit movement of the print glass 186 and the x-y plane and the z-axis. As illustrated in FIG. 11, three walls 190 are provided to limit movement of the print glass 186 in the x-y plane while two flanges 192 can be provided to limit movement of the print glass 186 in the z-axis.

The bed plate 182 can be of substantially uniform thickness T (see FIG. 10). The bed plate 182 can be of substantially same thickness T at the flanges 192 to facilitate with the auto-leveling procedures as discussed herein. In some embodiments, the bed plate 182 can be between about 0.2 millimeters and about 10 millimeters, including about 1 to about 7 millimeters, including about 1.5 millimeters, including the foregoing values and ranges bordering therebetween, depending on desired mechanical properties such as rigidity while balancing with desired aesthetics and functionality of the printer 102 (e.g., bulk or weight that has to be moved by the bed guide assembly 120).

The bed plate 182 can be made of any suitable materials including metals and metal alloys. For example, the bed plate 182 can be made of aluminum. The bed plate 182 can be made of a composition of materials providing desirable characteristics. For example, the bed plate 182 can be made of materials providing desired mechanical characteristics as discussed herein while allowing for conduction of electric current through the bed plate 182 to a connected electric circuit as discussed herein.

Figure 12:
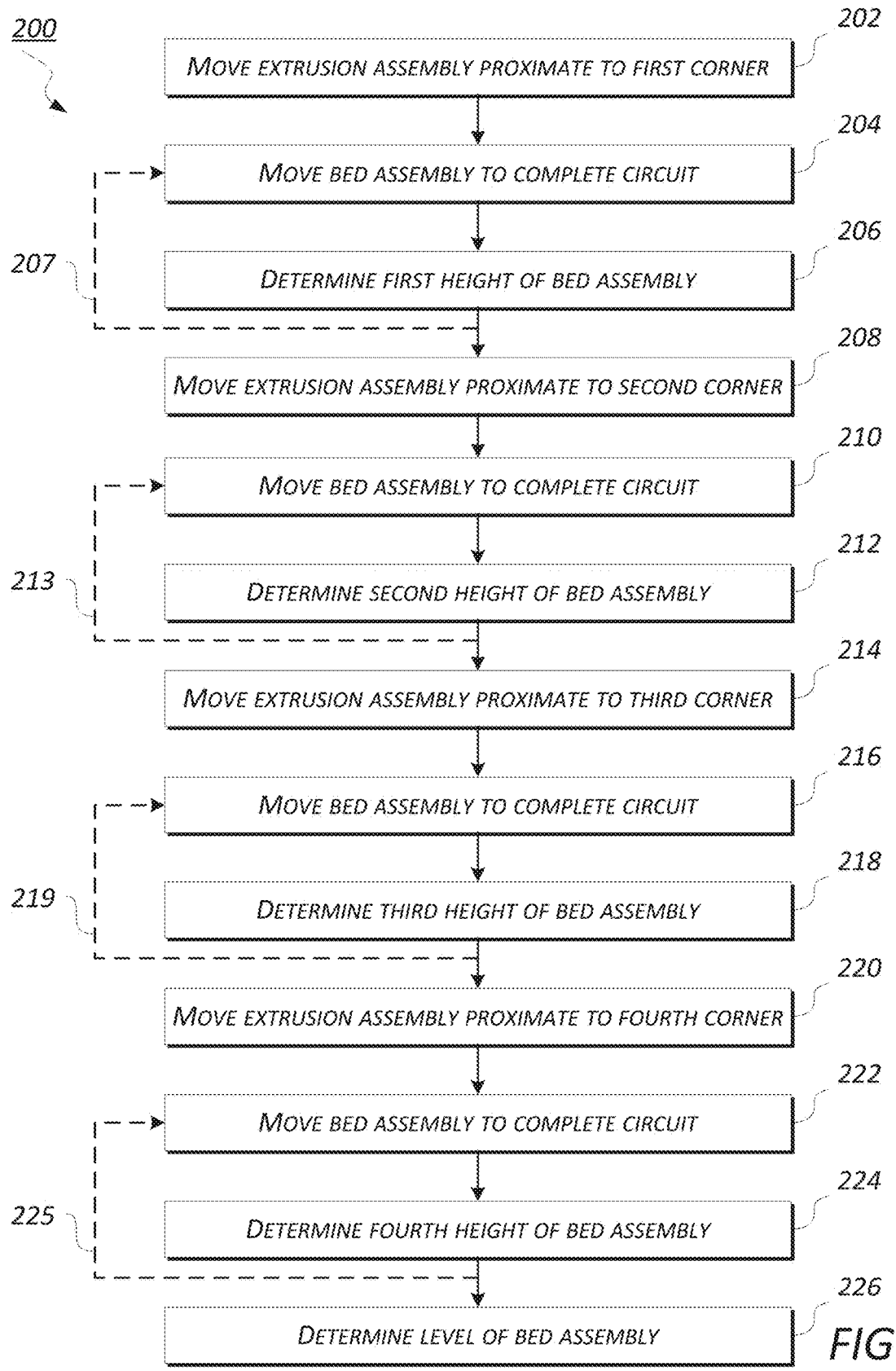
FIG. 12 is a flow diagram illustrating an example method for leveling the bed assembly.

FIG. 12 is a flow diagram illustrating an example method for leveling the bed assembly 110. A controller of the printer 102 as discussed herein can be programmed and configured to determine a level of the bed 110 (e.g., auto-leveling of the printer 102) per the method 200 illustrated in FIG. 12. While the method 200 discloses certain steps and in certain sequences, some steps may be added, omitted, or performed in a different order. For example, before beginning the bed leveling method 200, the controller may send commands or signals to move the extrusion assembly 112 and the bed assembly 110 for the hot end(s) 113 to be cleaned against the brush 123 to remove any residual consumable material to improve accuracy of height measurements as discussed herein.

At step 202, the controller can send commands or signals to the motors 128 to move 208 the extrusion assembly 112 in the x-y plane proximate to the first corner 148. As discussed herein, the first corner 148 is named as "first" for discussion purposes. The first corner 148 may be called a second, third, or fourth corner. Further step 202 and/or method 200 may start from any one of first, second, third, or fourth corners 148, 150, 152, 154. The extrusion assembly 112 is moved to a first position proximate to the first corner 148 to position at least one hot end 113 over a portion of the flange 192 proximate to the first corner 148 along the z-axis.

The controller can send commands or signals to a motor of the bed guide assembly 120 (see U.S. application Ser. No. 15/029,197, which is incorporated by reference and made a part of this specification) to move 204 the bed assembly 110 along the z-axis until the hot end 113 and the flange 192 contact or touch. As discussed herein, the hot end 113 can be made of any suitable material that can conduct electric current. Similarly, the bed plate 182 and the flange 192 can be made of any suitable material that can conduct electric current. The hot end 113 and the bed plate 182 can be electrically connected via an electrical circuit. The electrical circuit can be designed such that when the hot end 113 and the bed plate 182 are not in contact, the electrical circuit is open and electric current cannot flow through the electrical circuit. When the hot end 113 and the bed plate 182 are in contact, the electrical circuit is complete or closed, and electric current can flow through electrical circuit via flowing through the electrically conductive materials of the hot end 113 and the bed plate 182 in contact at a position proximate to the first corner 148.

When the electrical circuit is complete proximate to the first corner 148, the controller determines or receives data (via, for example, one or more sensors connected to the electrical circuit) that electric current is flowing. The controller stops movement of the bed assembly 110 upon flow of electric current and/or when electric current flow is detected. The controller determines 206 a first height along the z-axis where the hot end 113 contacts the flange 192 to complete the electrical circuit at the first position proximate to the first corner 148. Heights as discussed herein along the z-axis can be defined as relative to a reference point. For example, the bed assembly 110 may have a predefined range of travel along the z-axis. A height may be a distance from a reference point positioned at one of the ends of the range of travel. The controller may repeat 207 steps 204 and 206 to determine the first height multiple times or a plurality of times to verify the accuracy of the determined first height. The controller may use averages, precision determination, and/or other statistical algorithms to accept and determine the first height based on the multiple measurements and determinations of the first height at the first position proximate to the first corner 148.

At step 208, the controller can send commands or signals to the motors 128 to move 208 the extrusion assembly 112 in the x-y plane proximate to the second corner 150. As discussed herein, the second corner 150 is named as "second" for discussion purposes. The second corner 150 may be called a first, third, or fourth corner. The extrusion assembly 112 is moved to a second position proximate to the second corner 150 to position at least one hot end 113 over a portion of the flange 192 proximate to the second corner 150 along the z-axis.

The controller can send commands or signals to the motor of the bed guide assembly 120 to move 210 the bed assembly 110 along the z-axis until the hot end 113 and the flange 192 contact or touch. Electric current can flow through electrical circuit via flowing through the electrically conductive materials of the hot end 113 and the bed plate 182 in contact proximate to the second corner 150.

When the electrical circuit is complete proximate to the second corner 150, the controller determines or receives data (via, for example, one or more sensors connected to the electrical circuit) that electric current is flowing. The controller stops movement of the bed assembly 110 upon flow of electric current and/or when electric current flow is detected. The controller determines 212 a second height along the z-axis where the hot end 113 contacts the flange 192 to complete the electrical circuit at the second position proximate to the second corner 150. Heights as discussed herein along the z-axis can be defined as relative to a reference point. The controller may repeat 213 steps 210 and 212 to determine the second height multiple times or a plurality of times to verify the accuracy of the determined second height. The controller may use averages, precision determination, and/or other statistical algorithms to accept and determine the second height based on the multiple measurements and determinations of the third height at the third position proximate to the third corner 152.

At step 214, the controller can send commands or signals to the motors 128 to move 214 the extrusion assembly 112 in the x-y plane proximate to the third corner 152. As discussed herein, the third corner 152 is named as "third" for discussion purposes. The third corner 152 may be called a first, second, or fourth corner. The extrusion assembly 112 is moved to a third position proximate to the third corner 152 to position at least one hot end 113 over a portion of the flange 192 proximate to the third corner 152 along the z-axis.

The controller can send commands or signals to the motor of the bed guide assembly 120 to move 216 the bed assembly 110 along the z-axis until the hot end 113 and the flange 192 contact or touch. Electric current can flow through electrical circuit via flowing through the electrically conductive materials of the hot end 113 and the bed plate 182 in contact proximate to the third corner 152.

When the electrical circuit is complete proximate to the third corner 152, the controller determines or receives data (via, for example, one or more sensors connected to the electrical circuit) that electric current is flowing. The controller stops movement of the bed assembly 110 upon flow of electric current and/or when electric current flow is detected. The controller determines 212 a third height along the z-axis where the hot end 113 contacts the flange 192 to complete the electrical circuit at the third position proximate to the third corner 152. Heights as discussed herein, including the third height, along the z-axis can be defined as relative to a reference point. The controller may repeat 219 steps 216 and 218 to determine the third height multiple times or a plurality of times to verify the accuracy of the determined third height. The controller may use averages, precision determination, and/or other statistical algorithms to accept and determine the third height based on the multiple measurements and determinations of the third height at the third position proximate to the third corner 152.

At step 220, the controller can send commands or signals to the motors 128 to move 220 the extrusion assembly 112 in the x-y plane proximate to the fourth corner 154. As discussed herein, the fourth corner 154 is named as "fourth" for discussion purposes. The fourth corner 154 may be called a first, second, or third corner. The extrusion assembly 112 is moved to a fourth position proximate to the fourth corner 154 to position at least one hot end 113 over a portion of the flange 192 proximate to the fourth corner 154 along the z-axis.

The controller can send commands or signals to the motor of the bed guide assembly 120 to move 222 the bed assembly 110 along the z-axis until the hot end 113 and the flange 192 contact or touch. Electric current can flow through electrical circuit via flowing through the electrically conductive materials of the hot end 113 and the bed plate 182 in contact proximate to the fourth corner 154.

When the electrical circuit is complete proximate to the fourth corner 154, the controller determines or receives data (via, for example, one or more sensors connected to the electrical circuit) that electric current is flowing. The controller stops movement of the bed assembly 110 upon flow of electric current and/or when electric current flow is detected. The controller determines 212 a fourth height along the z-axis where the hot end 113 contacts the flange 192 to complete the electrical circuit at the fourth position proximate to the fourth corner 154. Heights as discussed herein, including the fourth height, along the z-axis can be defined as relative to a reference point. The controller may repeat 225 steps 222 and 224 to determine the fourth height multiple times or a plurality of times to verify the accuracy of the determined fourth height. The controller may use averages, precision determination, and/or other statistical algorithms to accept and determine the fourth height based on the multiple measurements and determinations of the fourth height at the fourth position proximate to the fourth corner 154.

Using the determined first, second, third, and/or fourth heights, the controller may determine 226 a level of the bed. The level of the bed can relate to a print plane of the print surface (e.g., on the print glass 186) and the relative angles (offset) if any of the print plane relative to the x-y plane perpendicular to the z-axis. The controller can take into account the thickness T of the bed plate 182 to determine the heights and level of the print plane on the print glass 186 where the 3D object will be printed. For example, if the thickness T of the bed plate 182 is 1.5 millimeters, the controller can determine that print plane (e.g., surface of the print glass 186) is 1.5 millimeters lower or further relative to the determined first, second, third, and/or fourth heights of the flange 192.

In some embodiments, the controller may perform method 200 for any combination of three corners and determine the level of the bed based on three heights because the print plane can be determined using three points (three heights). In some embodiments, the controller may make a height of the bed assembly 110 determination at any desired or predetermined position on the bed assembly 110 where the hot end 113 can contact the flange 192. For example, a height may be determined between the first corner 148 and the second corner 150, with other determined heights being determined at the third corner 152 and the fourth corner 154 to determine the print plane. The controller may take other height measurements between the first corner 148 and the second corner 150 and/or between the fourth corner 154 and the third corner 152 as points of verification (verifying or providing additional points of measurements to determine the print plane). In some embodiments, the controller may use alternative methods to measure the respective heights along the z-axis for various locations on the bed plate and/or printing surface. These methods may include pressure sensors, vibrations sensors, sound sensors, and any other method of determining the relative distance between the nozzle of the hot end 113 and the bed plate 110 and/or printing surface of the print glass 186.

The controller can then adjust the height of the bed assembly 110 depending on the position of the extrusion assembly 112 and/or hot end 113 in the x-y plane during printing based on the level of the print plane of the bed assembly 110. For example, if the first height is relatively higher than the third height, the controller may adjust the bed assembly 110 to move down along the z-axis as the extrusion assembly 112 moves from the first corner 148 to the third corner 152 during printing (or vice versa when extrusion assembly moves from the third corner 152 to the first corner 148). Similarly, if the second height is relatively higher than the fourth height, the controller may adjust the bed assembly 110 to move down along the z-axis as the extrusion assembly 112 moves from the second corner 150 to the fourth corner 154 during printing (or vice versa when extrusion assembly moves from the fourth corner 154 to the second corner 150). As another example, if the first height is relatively lower than the third height, the controller may adjust the bed assembly 110 to move up along the z-axis as the extrusion assembly 112 moves from the first corner 148 to the third corner 152 during printing (or vice versa when extrusion assembly moves from the third corner 152 to the first corner 148). Similarly, if the second height is relatively lower than the fourth height, the controller may adjust the bed assembly 110 to move up along the z-axis as the extrusion assembly 112 moves from the second corner 150 to the fourth corner 154 during printing (or vice versa when extrusion assembly moves from the fourth corner 154 to the second corner 150). Accordingly, the controller may adjust the height of the bed assembly 110 and correspondingly position the hot end 113 to be at the desired height relative to the 3D object being printed for the extruded material to be layered onto the 3D object at a desired or predetermined height.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc.," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. An auto-leveling system for a three-dimensional printer, the system comprising:
   a hot end configured to extrude consumable material to build a three-dimensional object, the hot end comprising an electrically conductive material;
   a hot end motion control assembly configured to move the hot end in an x-y plane;
   a print bed configured to support the three-dimensional object, the print bed comprising:
      a heat plate configured to support a print glass on which the three-dimensional object is built;
      a bed plate attached to the heat plate, the bed plate comprising:
         a base;
         a wall connected to the base, the wall extending along a z-axis at least partially circumscribing the heat plate, wherein the z-axis is perpendicular to the x-y plane; and
         a flange connected to the wall and comprising an electrically conductive material, the flange extending in the x-y plane over the heat plate such that the heat plate is between the base and the flange, wherein when the electrically conductive material of the flange contacts the electrically conductive material of the hot end, an electrical circuit is completed; and
      one or more springs disposed between the heat plate and a portion of the bed plate, the one or more springs disposed coaxially about one or more fasteners that extend through the heat plate and the bed plate, the one or more springs exerting a biasing force that secures the print glass between the heat plate and the flange;

a print bed motion control assembly configured to move the print bed in the z-axis; and a controller configured to send commands to the hot end motion control assembly to move the hot end and send commands to the print bed motion control assembly to move the print bed, the controller configured to automatically determine a level of the print bed relative to the x-y plane by:

sending a first command to the hot end motion control assembly to move the hot end to a first position in the x-y plane proximate to a first corner of the print bed over the electrically conductive material of the flange;

sending a second command to the print bed motion control assembly to move the print bed along the z-axis to the hot end until the electrical circuit is completed by the electrically conductive material of the hot end contacting the electrically conductive material of the flange proximate to the first corner;

determining a first height along the z-axis where the hot end contacts the flange to complete the electrical circuit at the first position proximate to the first corner;

sending a third command to the hot end motion control assembly to move the hot end to a second position in the x-y plane proximate to a second corner of the print bed over the electrically conductive material of the flange;

sending a fourth command to the print bed motion control assembly to move the print bed along the z-axis to the hot end until the electrical circuit is completed by the electrically conductive material of the hot end contacting the electrically conductive material of the flange proximate to the second corner;

determining a second height along the z-axis where the hot end contacts the flange to complete the electrical circuit at the second position proximate to the second corner;

sending a fifth command to the hot end motion control assembly to move the hot end to a third position in the x-y plane proximate to a third corner of the print bed over the electrically conductive material of the flange;

sending a sixth command to the print bed motion control assembly to move the print bed along the z-axis to the hot end until the electrical circuit is completed by the electrically conductive material of the hot end contacting the electrically conductive material of the flange proximate to the third corner;

determining a third height along the z-axis where the hot end contacts the flange to complete the electrical circuit at the third position proximate to the third corner;

sending a seventh command to the hot end motion control assembly to move the hot end to a fourth position in the x-y plane proximate to a fourth corner of the print bed over the electrically conductive material of the flange;

sending an eighth command to the print bed motion control assembly to move the print bed along the z-axis to the hot end until the electrical circuit is completed by the electrically conductive material of the hot end contacting the electrically conductive material of the flange proximate to the fourth corner; and determining a fourth height along the z-axis where the hot end contacts the flange to complete the electrical circuit at the fourth position proximate to the fourth corner, wherein the print bed is moved along the z-axis depending on a position of the hot end in the x-y plane during printing of the three-dimensional object based on the level of the printer bed at the position of the hot end in the x-y plane.

2. The system of claim 1, wherein after determining the first height, the controller is configured to again send at least one of the second, fourth, sixth, or eighth commands to verify at least one of the first, second, third, or fourth heights, respectively, by again completing the electrical circuit by the electrically conductive material of the hot end contacting the electrically conductive material of the flange proximate to at least one of the first, second, third, or fourth corners, respectively.

3. The system of claim 1, wherein the electrically conductive material of at least one of the hot end or the bed plate comprises aluminum.

4. The system of claim 1, wherein the flange is of a uniform thickness, and wherein the controller determines an offset distance to the print glass based on the uniform thickness.

5. The system of claim 1, wherein the bed plate comprises an opening configured to allow the print glass to slide in the x-y plane into the print bed against the heat plate to be supported by the heat plate.

6. The system of claim 1, wherein the print glass is sandwiched between the heat plate and the flange to facilitate positioning the print glass relative to the print bed when the print glass is on the print bed.

7. The system of claim 1, wherein the controller is configured to determine at least one of the first, second, third, or fourth heights a plurality of times, and to evaluate an accuracy of the at least one of the first, second, third, or fourth heights using one or more statistical algorithms.

* * * * *